(12) United States Patent
Zhu et al.

(10) Patent No.: US 12,200,641 B2
(45) Date of Patent: Jan. 14, 2025

(54) METHOD AND APPARATUS FOR BEAM MEASUREMENT, REPORTING AND INDICATION

(71) Applicant: Samsung Electronics Co., Ltd., Suwon-si (KR)

(72) Inventors: Dalin Zhu, Richardson, TX (US); Md. Saifur Rahman, Plano, TX (US); Emad N. Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 17/447,916

(22) Filed: Sep. 16, 2021

(65) Prior Publication Data

US 2022/0095254 A1    Mar. 24, 2022

Related U.S. Application Data

(60) Provisional application No. 63/244,517, filed on Sep. 15, 2021, provisional application No. 63/086,345, (Continued)

(51) Int. Cl.
*H04W 56/00* (2009.01)
*H04B 17/318* (2015.01)
(Continued)

(52) U.S. Cl.
CPC ........ *H04W 56/001* (2013.01); *H04B 17/318* (2015.01); *H04L 5/0051* (2013.01);
(Continued)

(58) Field of Classification Search
CPC ... H04L 5/0016; H04L 5/0048; H04L 5/0051; H04W 24/10; H04W 52/36; H04W 56/001; H04W 76/11; H04B 7/066
(Continued)

(56) References Cited

U.S. PATENT DOCUMENTS

2019/0165847 A1   5/2019 Kim et al.
2019/0190582 A1   6/2019 Guo et al.
(Continued)

FOREIGN PATENT DOCUMENTS

KR   10-2020-0090830 A        7/2020
WO   WO-2018232090 A1 * 12/2018  ........... H04B 7/0626
WO   2020052491 A1        3/2020

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Harun Chowdhury

(57) ABSTRACT

Methods and apparatuses for beam measurement, reporting, and indication operations. A method for a user equipment includes receiving first configuration information for joint reporting, in a same reporting instance, of both one or more synchronization signal block resource indicators (SSBRIs) and channel state information reference signal resource indicators (CRIs); and receiving second configuration information for differential reference signal received power (RSRP) reporting of RSRP values for the one or more SSBRIs and CRIs, respectively. The method further includes determining, based on the first configuration information, the one or more SSBRIs and CRIs and determining, based on the second configuration information, the RSRP values for the one or more SSBRIs and CRIs, respectively. The method further includes transmitting position information associated with the RSRP values included in the joint reporting and transmitting, in the reporting instance, the joint reporting including the one or more SSBRIs and CRIs and the RSRP values.

15 Claims, 17 Drawing Sheets

Related U.S. Application Data filed on Oct. 1, 2020, provisional application No. 63/081,635, filed on Sep. 22, 2020.

(51) Int. Cl.

| | | |
|---|---|---|
| *H04L 5/00* | (2006.01) | |
| *H04W 72/044* | (2023.01) | |
| *H04W 72/21* | (2023.01) | |
| *H04W 72/541* | (2023.01) | |
| *H04W 72/542* | (2023.01) | |

(52) U.S. Cl.
CPC ......... *H04W 72/046* (2013.01); *H04W 72/21* (2023.01); *H04W 72/541* (2023.01); *H04W 72/542* (2023.01)

(58) Field of Classification Search
USPC ........................................ 370/252, 329, 331
See application file for complete search history.

(56) References Cited

U.S. PATENT DOCUMENTS

| | | | |
|---|---|---|---|
| 2019/0215897 A1 | 7/2019 | Babaei et al. | |
| 2020/0021373 A1 | 1/2020 | Cheng et al. | |
| 2020/0059290 A1 | 2/2020 | Pan et al. | |
| 2020/0304218 A1 | 9/2020 | Gao et al. | |
| 2020/0336194 A1* | 10/2020 | Karjalainen | H04W 24/10 |
| 2021/0184750 A1* | 6/2021 | Gao | H04W 56/001 |
| 2021/0345141 A1 | 11/2021 | Cao | |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

International Search Report and Written Opinion issued Dec. 21, 2021 regarding International Application No. PCT/KR2021/012856, 9 pages.

Extended European Search Report issued Jan. 31, 2024 regarding Application No. 21872868.1, 13 pages.

Nokia et al., "Remaining details on beam indication, measurement and reporting", 3GPP TSG RAN WG1 Meeting AH1-18, R1-1800751, Jan. 2018, 7 pages.

Samsung, "Terminology mismatch for CSI framework", 3GPP TSG RAN WG1 NR-AH1, R1-1800426, Jan. 2018, 5 pages.

\* cited by examiner

METHOD AND APPARATUS FOR BEAM MEASUREMENT, REPORTING AND INDICATION

CROSS-REFERENCE TO RELATED APPLICATIONS AND CLAIM OF PRIORITY

The present application claims priority to U.S. Provisional Patent Application No. 63/081,635, filed on Sep. 22, 2020, U.S. Provisional Patent Application No. 63/086,345, filed on Oct. 1, 2020, and U.S. Provisional Patent Application No. 63/244,517, filed on Sep. 15, 2021. The content of the above-identified patent document is incorporated herein by reference.

TECHNICAL FIELD

The present disclosure relates generally to wireless communication systems and, more specifically, the present disclosure relates to beam measurement, reporting, and indication operations.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam measurement, reporting, and indication operations.

In one embodiment, a user equipment (UE) is provided. The UE includes a transceiver configured to receive: first configuration information for joint reporting, in a same reporting instance, of both one or more synchronization signal block resource indicators (SSBRIs) and one or more channel state information reference signal resource indicators (CRIs); and second configuration information for differential reference signal received power (RSRP) reporting of RSRP values for the one or more SSBRIs and CRIs, respectively. The UE also includes a processor operably coupled to the transceiver. The processor is configured to determine, based on the first configuration information, the one or more SSBRIs and CRIs; and determine, based on the second configuration information, the RSRP values for the one or more SSBRIs and CRIs, respectively. The RSRP values include a largest RSRP value and one or more differential RSRP values relative to the largest RSRP value. The transceiver is further configured to transmit: position information associated with the RSRP values included in the joint reporting, the position information indicating a position in the reporting instance of one or more of the RSRP values included in the joint reporting; and in the reporting instance, the joint reporting including the one or more SSBRIs and CRIs and the RSRP values.

In another embodiment, a base station (BS) is provided. The BS includes a transceiver configured to transmit, to a UE: first configuration information for joint reporting, in a same reporting instance, of both one or more SSBRIs and one or more CRIs; and second configuration information for differential RSRP reporting of RSRP values for the one or more SSBRIs and CRIs, respectively. The transceiver is further configured to receive, from the UE, position information associated with the RSRP values included in the joint reporting, the position information indicating a position in the reporting instance of one or more of the RSRP values included in the joint reporting; and in the reporting instance, the joint reporting including the one or more SSBRIs and CRIs and the RSRP values. The RSRP values include a largest RSRP value and one or more differential RSRP values relative to the largest RSRP value. The BS further includes a processor operably coupled to the transceiver. The processor is configured to identify, based on the position information, the RSRP values for the one or more SSBRIs and CRIs, respectively.

In yet another embodiment, a method for operating a UE is provided. The method includes receiving first configuration information for joint reporting, in a same reporting instance, of both one or more SSBRIs and one or more CRIs; and receiving second configuration information for differential RSRP reporting of RSRP values for the one or more SSBRIs and CRIs, respectively. The method further includes determining, based on the first configuration information, the one or more SSBRIs and CRIs; and determining, based on the second configuration information, the RSRP values for the one or more SSBRIs and CRIs, respectively. The RSRP values include a largest RSRP value and one or more differential RSRP values relative to the largest RSRP value. The method further includes transmitting position information associated with the RSRP values included in the joint reporting, the position information indicating a position in the reporting instance of one or more of the RSRP values included in the joint reporting; and transmitting, in the reporting instance, the joint reporting including the one or more SSBRIs and CRIs and the RSRP values.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
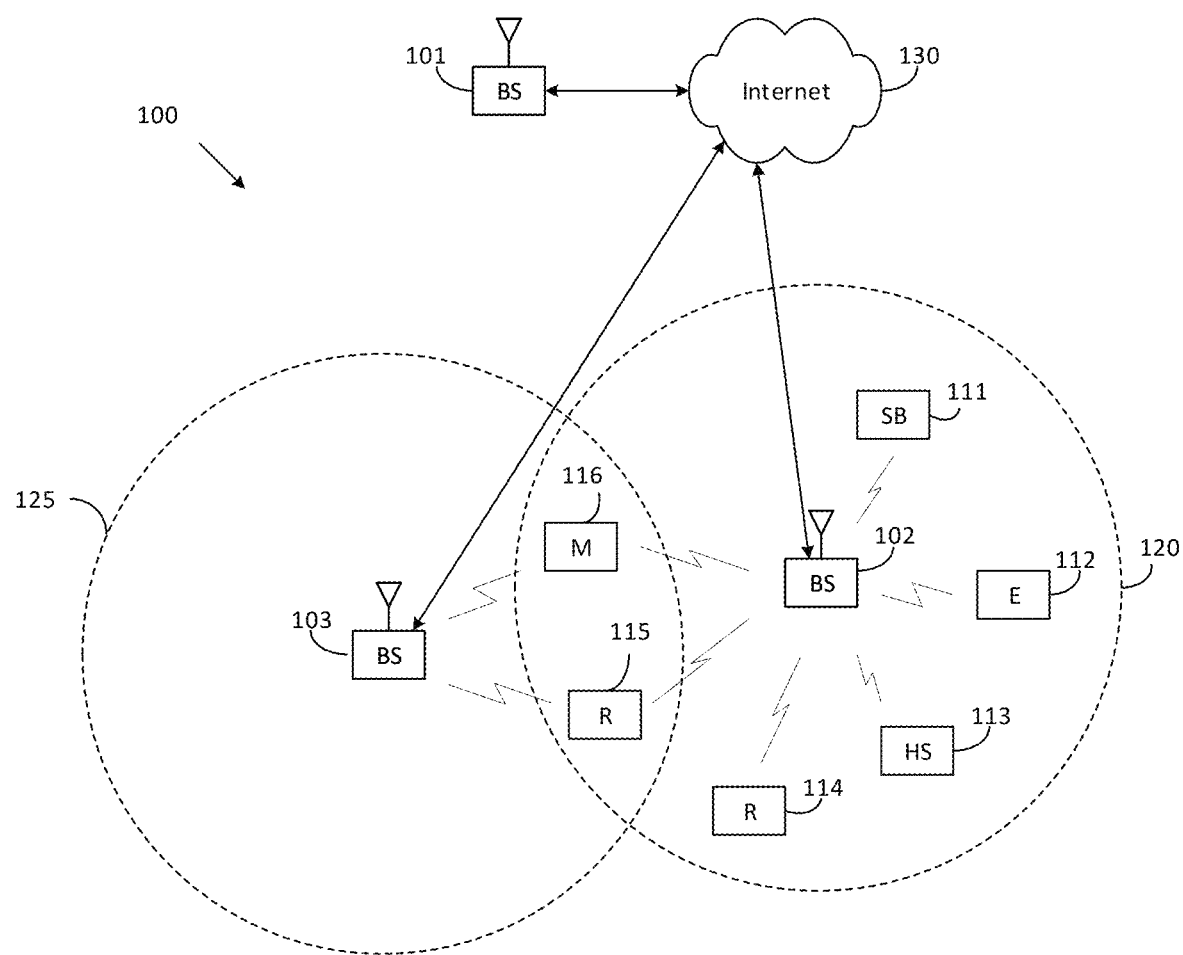
FIG. 1 illustrates an example wireless network according to embodiments of the present disclosure.
Figure 2:
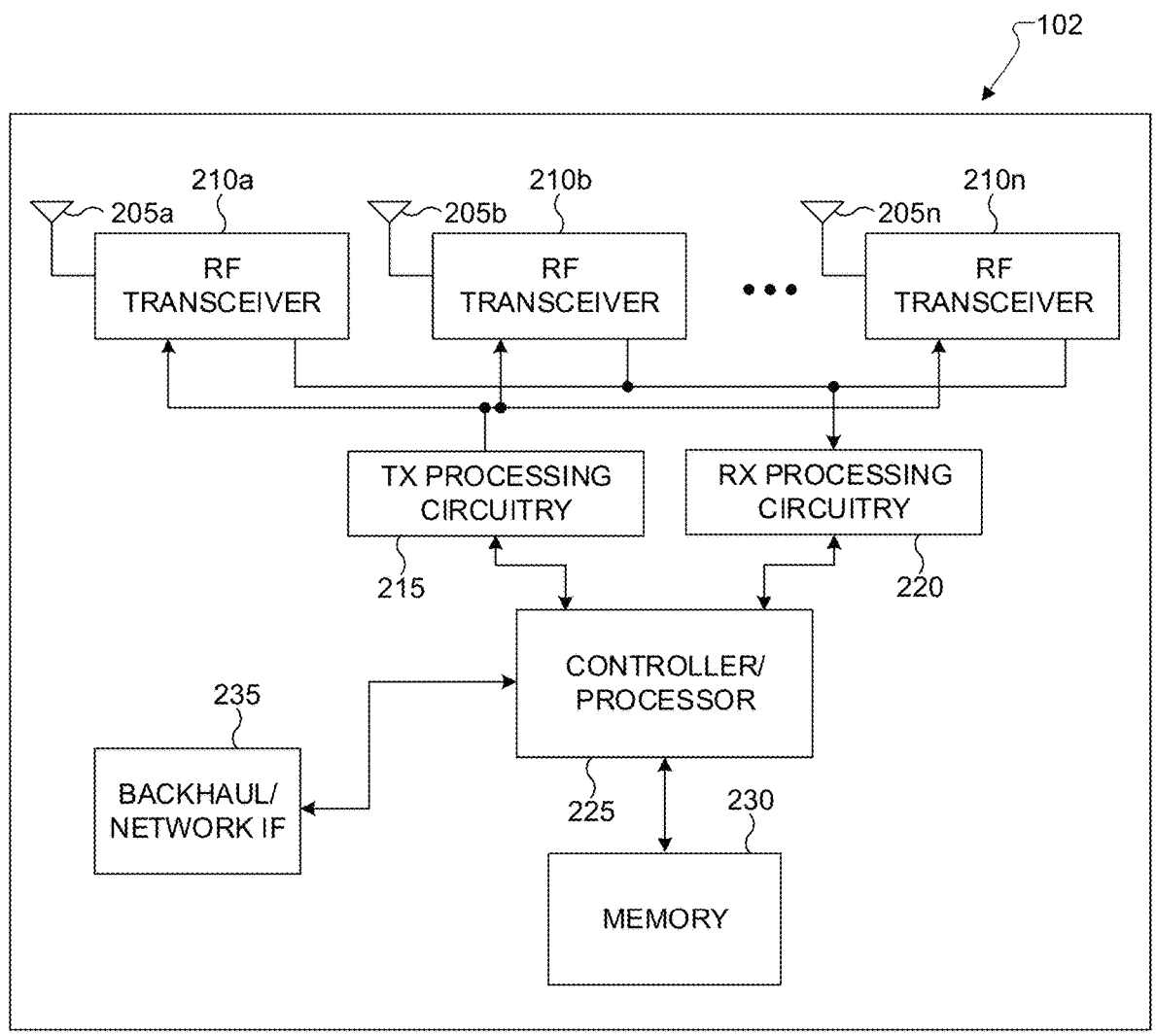
FIG. 2 illustrates an example gNB according to embodiments of the present disclosure.
Figure 3:
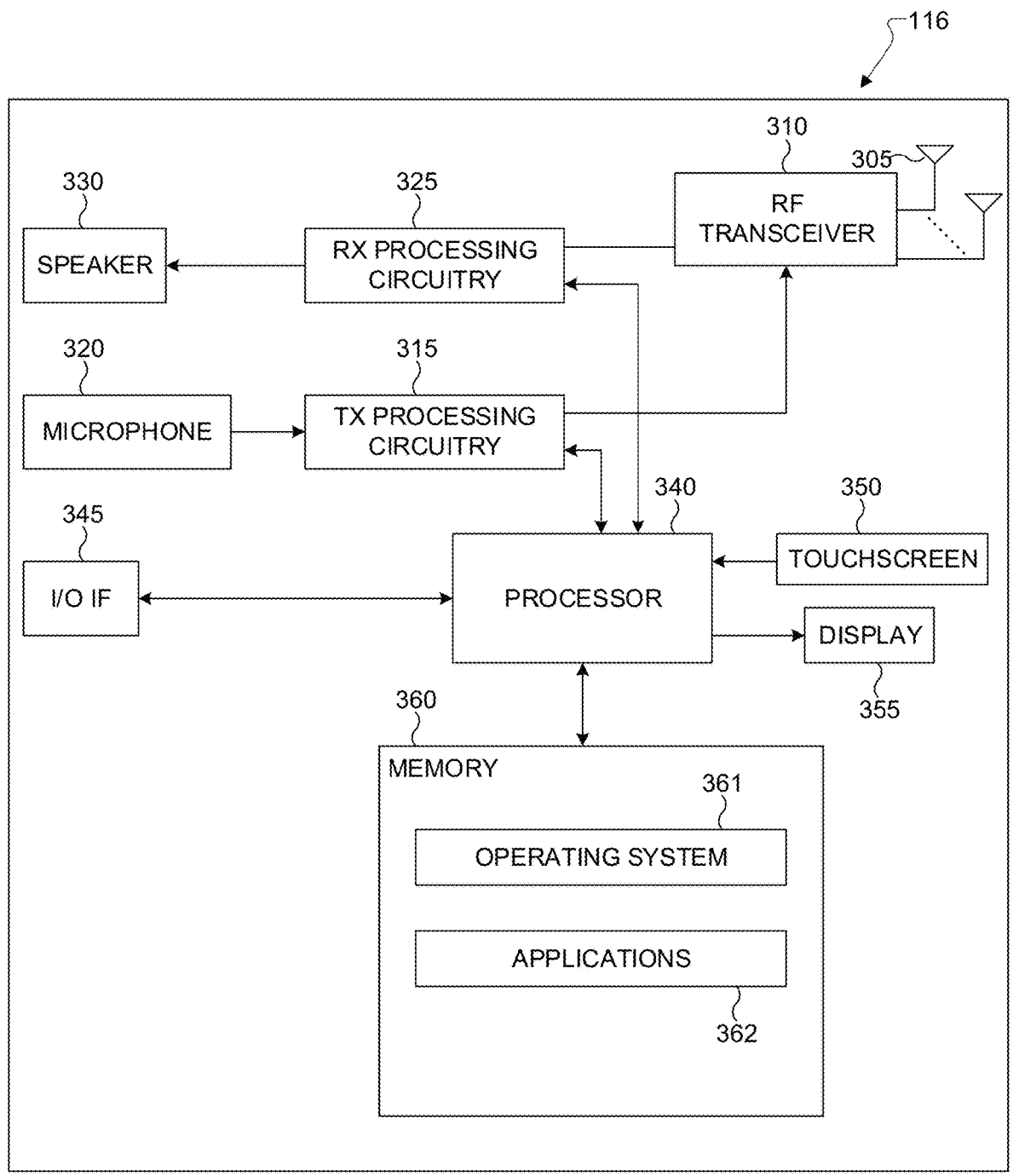
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam measurement, reporting, and indication operations. In certain embodiments, and one or more of the gNBs 101-103 includes circuitry, programing, or a combination thereof, for beam measurement, reporting, and indication operations.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam measurement, reporting, and indication operations. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
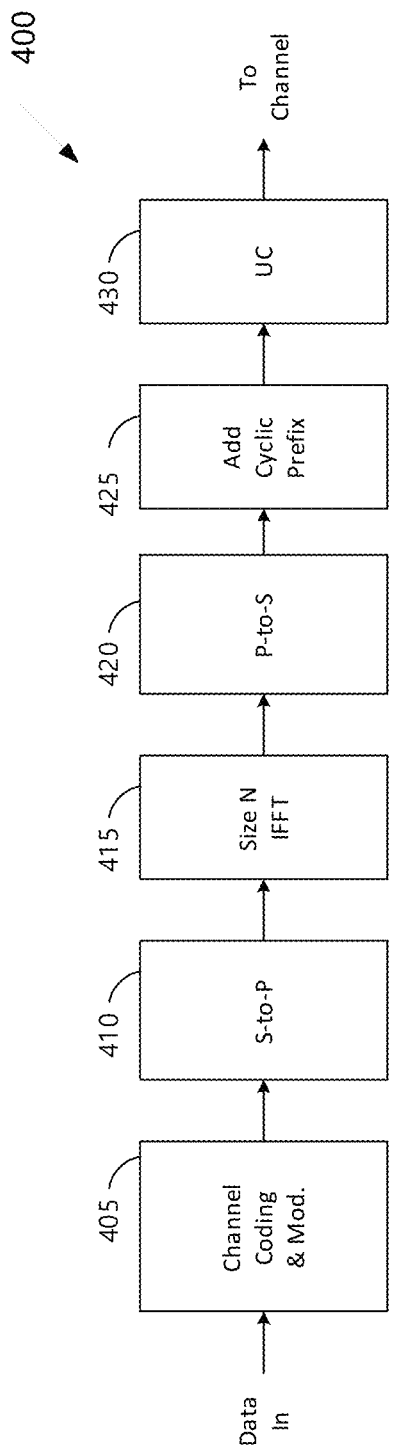
FIGS. 4 and 5 illustrate example wireless transmit and receive paths according to this disclosure.
Figure 5:
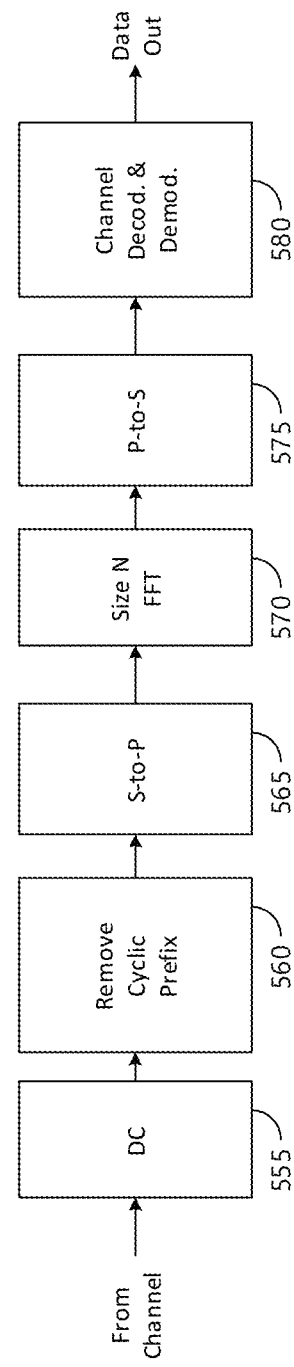

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
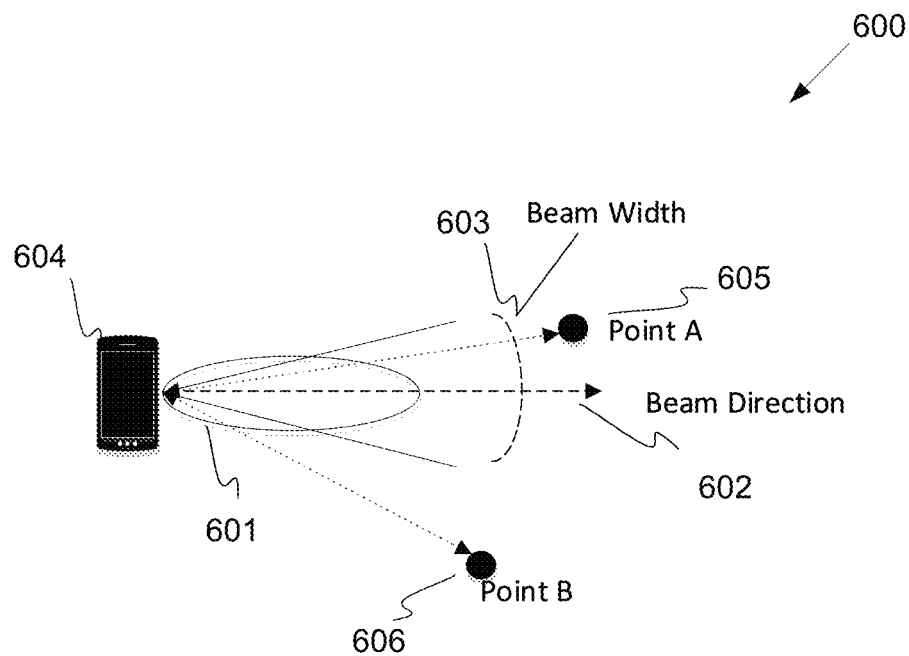
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only.

As illustrated in FIG. 6A, in the wireless system 600, a beam 601, for a device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B (606) cannot receive from and transmit to device (604) as Point B is outside a beam width and direction of a beam from device (604). While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
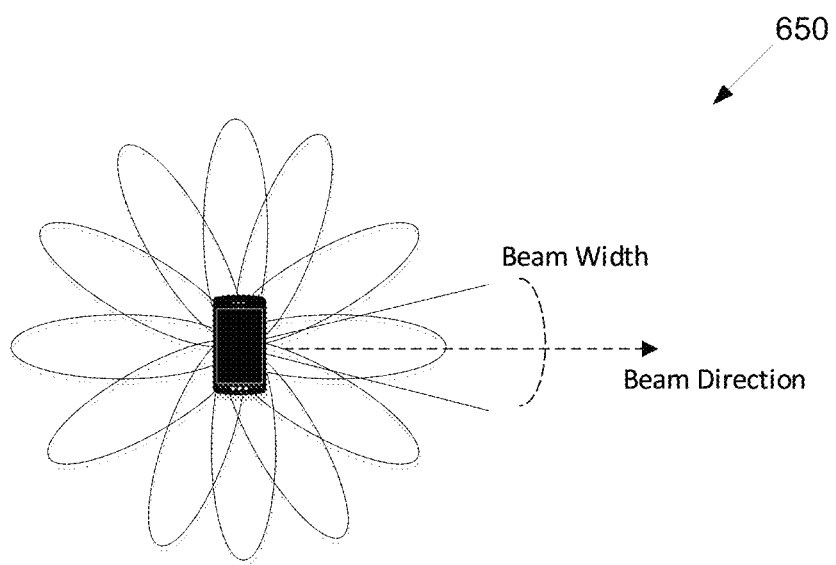
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
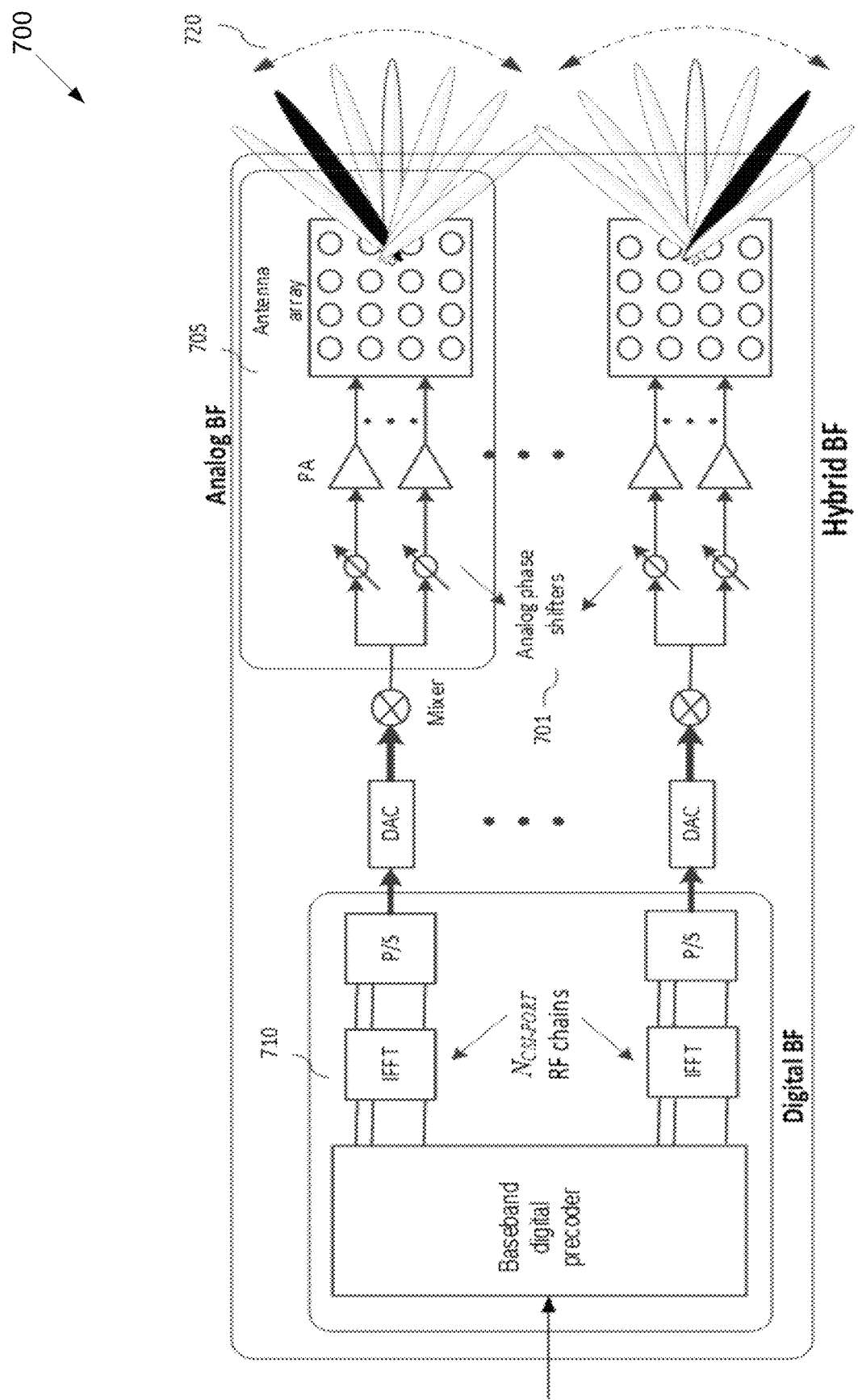
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The described system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

In a wireless communication system, one or more transmit-receive (TX-RX) beam pair links (BPLs) could be established between the network (e.g., the gNB) and the UE to transmit/receive the data/control information. To ensure sufficient BPL quality, an exhaustive search of all combinations of TX-RX beams could be performed (also referred to as one-stage beam acquisition design), from which the best TX-RX beam pair(s) could be determined. A large amount of TX-RX beam sweeping/scanning/training is required though, which could be a source of overhead. Especially with large number of candidate beams and/or when the UE is moving at high speed, frequent and exhaustive TX-RX beam pairs search would introduce significantly large signaling overhead and access latency, which is undesirable for various deployment scenarios and system settings in the 5G NR and future-generation wireless communications systems.

To reduce the beam acquisition latency and overhead, a two-stage beam acquisition procedure could be used. For example, at the first stage, the UE could be configured by the network a set of SSB resources/beams. The UE could measure the configured SSB resources/beams and report to the network one or more SSB resource indicators (SSBRIs) along with their corresponding beam metrics such as L1 SS-RSRPs. Furthermore, at the second stage, the UE could be configured by the network a set of CSI-RS resources/beams. The UE could measure the configured CSI-RS resources/beams and report to the network one or more CSI-RS resource indicators (CRIs) along with their corresponding beam metrics such as L1 CSI-RSRPs. In contrast to the one-stage design, the two-stage approach could facilitate the overall beam acquisition process. Beam measurement and reporting mechanism(s)/format(s) for the two-stage approach shall be specified or enhanced.

Additionally, in a system comprising multiple transmission-reception points (TRPs), the UE could simultaneously receive from different TRPs various RSs/channels such as SSBs, NZP CSI-RSs, PDCCHs or PDSCHs. In this disclosure, a TRP can represent a collection of measurement antenna ports, measurement RS resources and/or control resource sets (CORESETs). For example, a TRP could be associated with one or more of: a plurality of CSI-RS resources or a plurality of CRIs (CSI-RS resource indices/indicators) or a measurement RS resource set, for example, a CSI-RS resource set along with its indicator or a plurality of CORESETs associated with a CORESETPoolIndex or a plurality of CORESETs associated with a TRP-specific index/indicator/identity.

Furthermore, different TRPs could broadcast/be associated with different physical cell identities (PCIs) and one or more TRPs in the system could broadcast/be associated with different PCIs from that of serving cell/TRP. In the system comprising multiple TRPs, the UE could be configured by the network one or more sets of SSB resources/beams or CSI-RS resources/beams from different TRPs. The UE could measure the configured SSB resources/beams or CSI-RS resources/beams from different TRPs, and report to the network one or more SSBRIs or CRIs (and therefore, their corresponding beam metrics such as L1-RSRPs or L1-SINRs) for the TRPs. Beam measurement and reporting mechanism(s)/format(s) for the aforementioned multi-TRP operation shall be specified or enhanced.

The present disclosure considers various design aspects for beam measurement and reporting in a wireless communication system, wherein a two-stage beam acquisition procedure could be enabled or simultaneous transmission/reception with multiple TRPs is supported.

Figure 8:
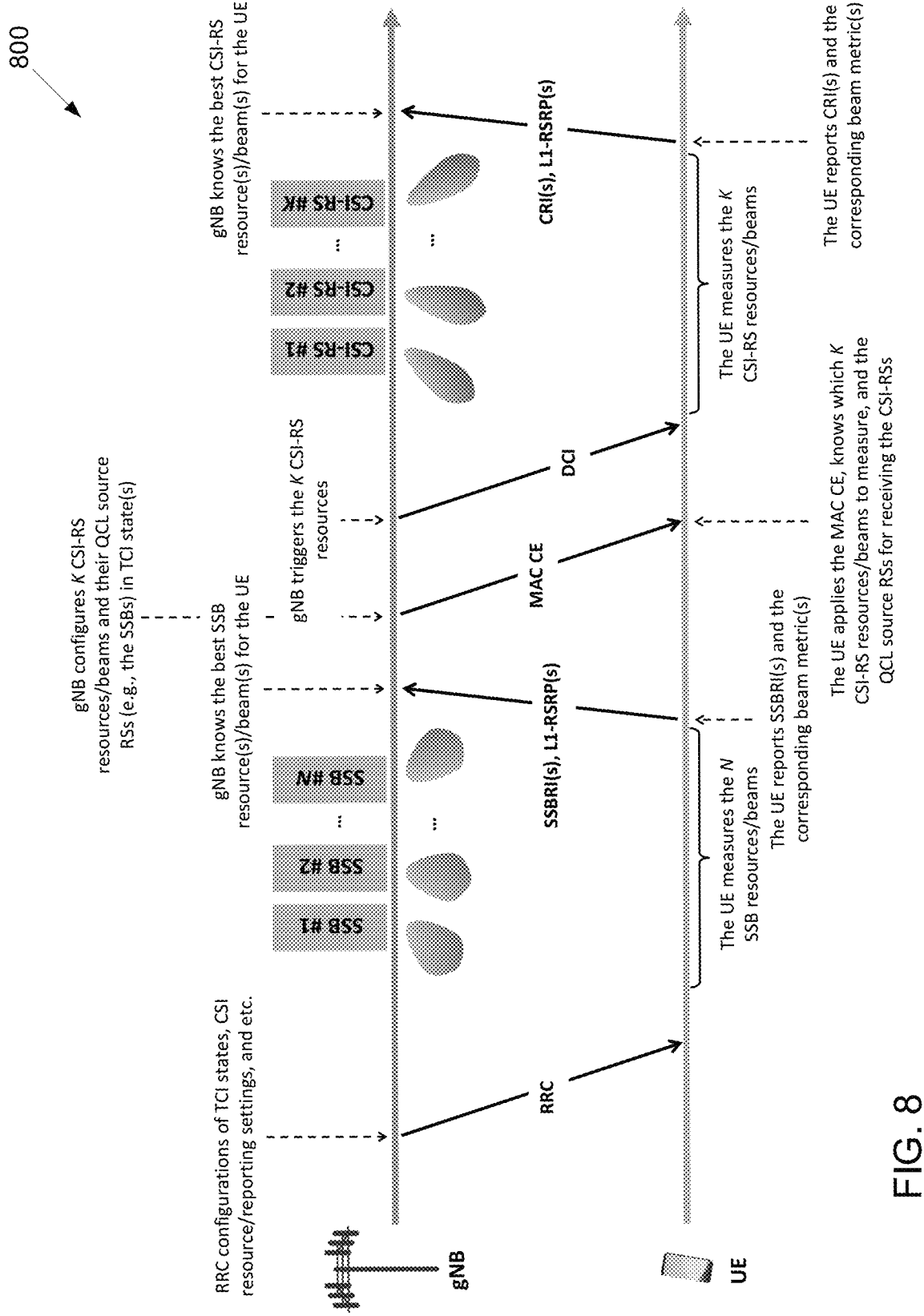
FIG. 8 illustrates an example two-stage beam acquisition and separate SSBRI/CRI reporting according to embodiments of the present disclosure.

FIG. 8 illustrates an example two-stage beam acquisition and separate SSBRI/CRI reporting 800 according to embodiments of the present disclosure. An embodiment of the two-stage beam acquisition and the separate SSBRI/CRI reporting 800 shown in FIG. 8 is for illustration only.

As illustrated in FIG. 8, an example of the two-stage beam acquisition design is presented. At the first stage of the beam acquisition, the UE could be first higher layer configured by the network (e.g., via higher layer RRC signaling) a set of N SSB resources/beams. The UE could then measure the configured N SSB resources/beams, and report to the network (e.g., the gNB) one or more SSBRIs along with their corresponding beam metrics such as L1 SS-RSRPs. At the second stage of the beam acquisition, the UE could be first higher layer configured by the network (e.g., via higher layer RRC signaling) a set of CSI-RS resources/beams. The UE could then receive from the network a MAC CE activation command to activate a set of K CSI-RS resources/beams from the higher layer configured set of CSI-RS resources/beams. The UE could further receive from the network a DCI (e.g., in form of DCI format 1_0) to trigger the measurement and reporting of the K CSI-RS resources/beams. The UE could measure the K CSI-RS resources/beams, and report to the network (e.g., the gNB) one or more CRIs along with their corresponding beam metrics such as L1 CSI-RSRPs.

To set receive filter(s) for receiving the second-stage CSI-RS resources/beams, the UE could be indicated by the network QCL source RS(s) for the K CSI-RS resources/beams. In the two-stage beam acquisition design presented in this disclosure, a QCL source RS for the set of K CSI-RS resources/beams could be a SSB resource/beam from the set of N SSB resources/beams. It is evident from FIG. 8 that for the two-stage beam acquisition approach, the UE could report to the network in separate (CSI) reporting instances (e.g., first and second reporting instances) the resource indicator(s) such as SSBRI(s) (and therefore, the corresponding beam metric(s)) obtained at stage-1 (e.g., in the first reporting instance), and the resource indicator(s) such as CRI(s) (and therefore, the corresponding beam metric(s)) obtained at stage-2 (e.g., in the second reporting instance).

For the two-stage beam acquisition design, the UE could report to the network in a single (CSI) reporting instance/CSI-Report the resource indicator(s) such as SSBRI(s) (and therefore, the corresponding beam metric(s)) obtained at stage-1, and the resource indicator(s) such as CRI(s) (and therefore, the corresponding beam metric(s)) obtained at stage-2.

Figure 9A:
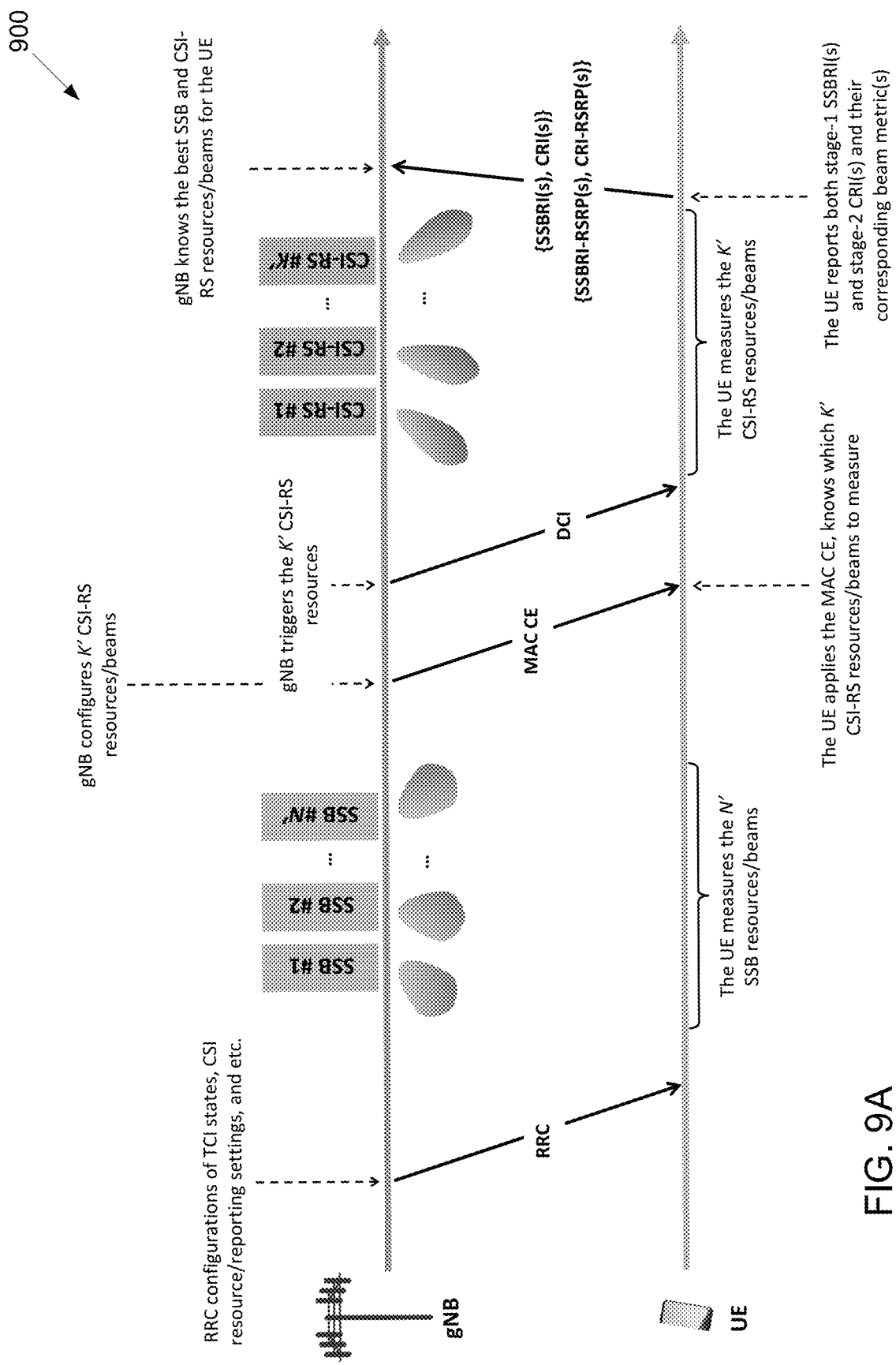
FIG. 9A illustrates an example two-stage beam acquisition and joint/mixed SSBRI/CRI reporting according to embodiments of the present disclosure.

FIG. 9A illustrates an example two-stage beam acquisition and joint/mixed SSBRI/CRI reporting 900 according to embodiments of the present disclosure. An embodiment of the two-stage beam acquisition and the joint/mixed SSBRI/CRI reporting 900 shown in FIG. 9A is for illustration only.

As illustrated in FIG. 9A, an example of reporting in a single reporting instance the resource indicators and the corresponding beam metrics for both stage-1 and stage-2 beam acquisition is presented. As illustrated in FIG. 9A, at stage-1, the UE could be first higher layer configured by the network (e.g., via higher layer RRC signaling) a set of N' SSB resources/beams; the UE could then measure the configured N' SSB resources/beams. At stage-2, the UE could be first higher layer configured by the network (e.g., via higher layer RRC signaling) a set of CSI-RS resources/beams; the UE could then receive from the network a MAC CE activation command activating a set of K' CSI-RS resources/beams from the higher layer configured set of CSI-RS resources/beams; the UE could further receive from the network a DCI (e.g., in form of DCI format 1_0) to trigger the measurement and reporting of the K' CSI-RS resources/beams; upon receiving the DCI triggering, the UE could measure the K' CSI-RS resources/beams.

Furthermore, as illustrated in FIG. 9A, after the UE has measured the CSI-RS resources/beams at stage-2, the UE would report to the network in the same (CSI) reporting instance/CSI-Report the resource indicators such as SSBRI(s) and CRI(s) and their corresponding beam metrics such as SS-RSRP(s) and CSI-RSRP(s) obtained by measuring both the SSB resources/beams at stage-1 and the CSI-RS resources/beams at stage-2.

Figure 9B:
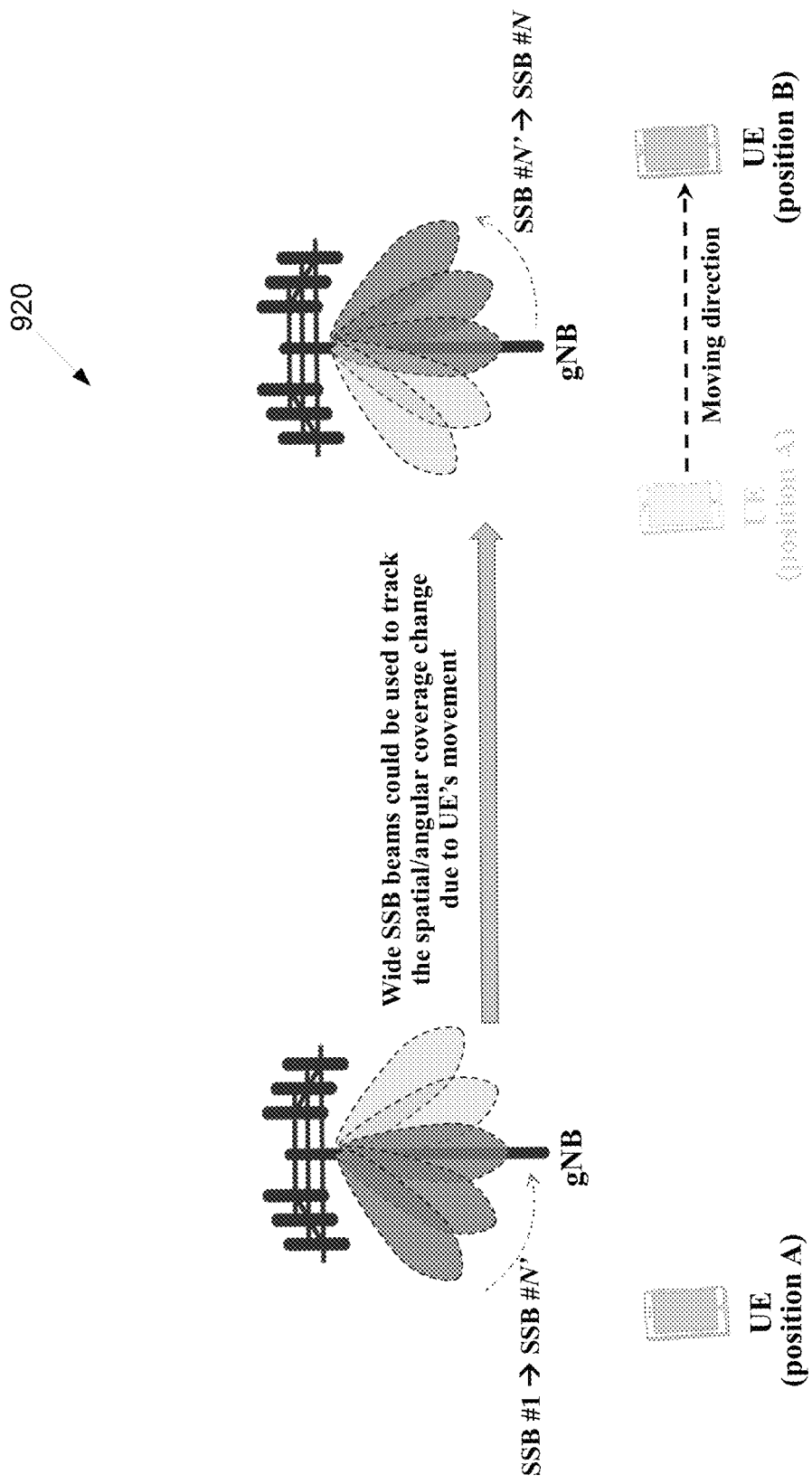
FIG. 9B illustrates an example configurations of the SSB beams and the CSI-RS beams according to embodiments of the present disclosure.

FIG. 9B illustrates an example configurations of the SSB beams and the CSI-RS beams 920 according to embodiments of the present disclosure. An embodiment of the configurations of the SSB beams and the CSI-RS beams 920 shown in FIG. 9B is for illustration only.

Figure 9C:
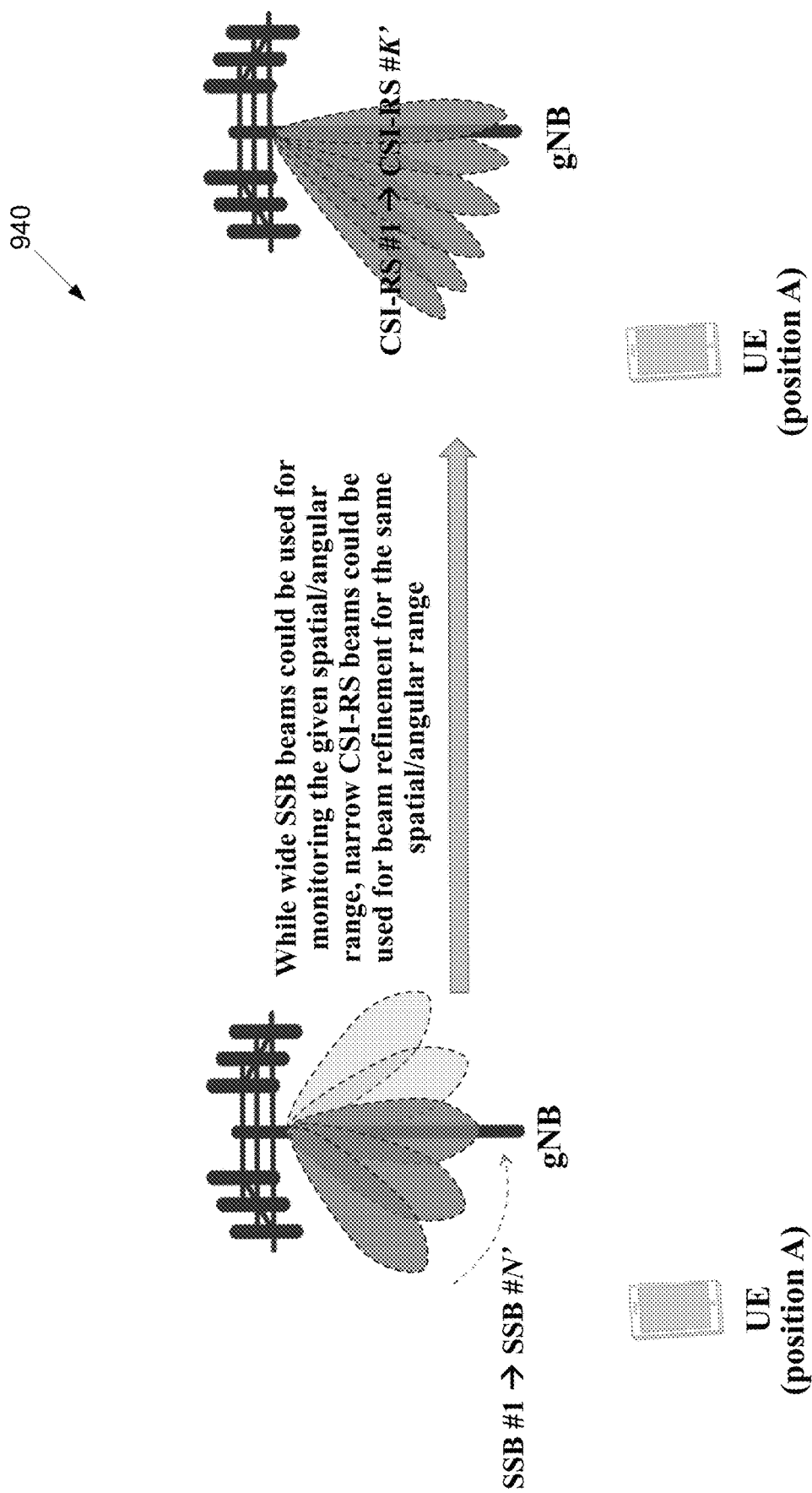
FIG. 9C illustrates another example configurations of the SSB beams and the CSI-RS beams according to embodiments of the present disclosure.

FIG. 9C illustrates another example configurations of the SSB beams and the CSI-RS beams 940 according to embodiments of the present disclosure. An embodiment of the configurations of the SSB beams and the CSI-RS beams 940 shown in FIG. 9C is for illustration only.

Figure 9D:
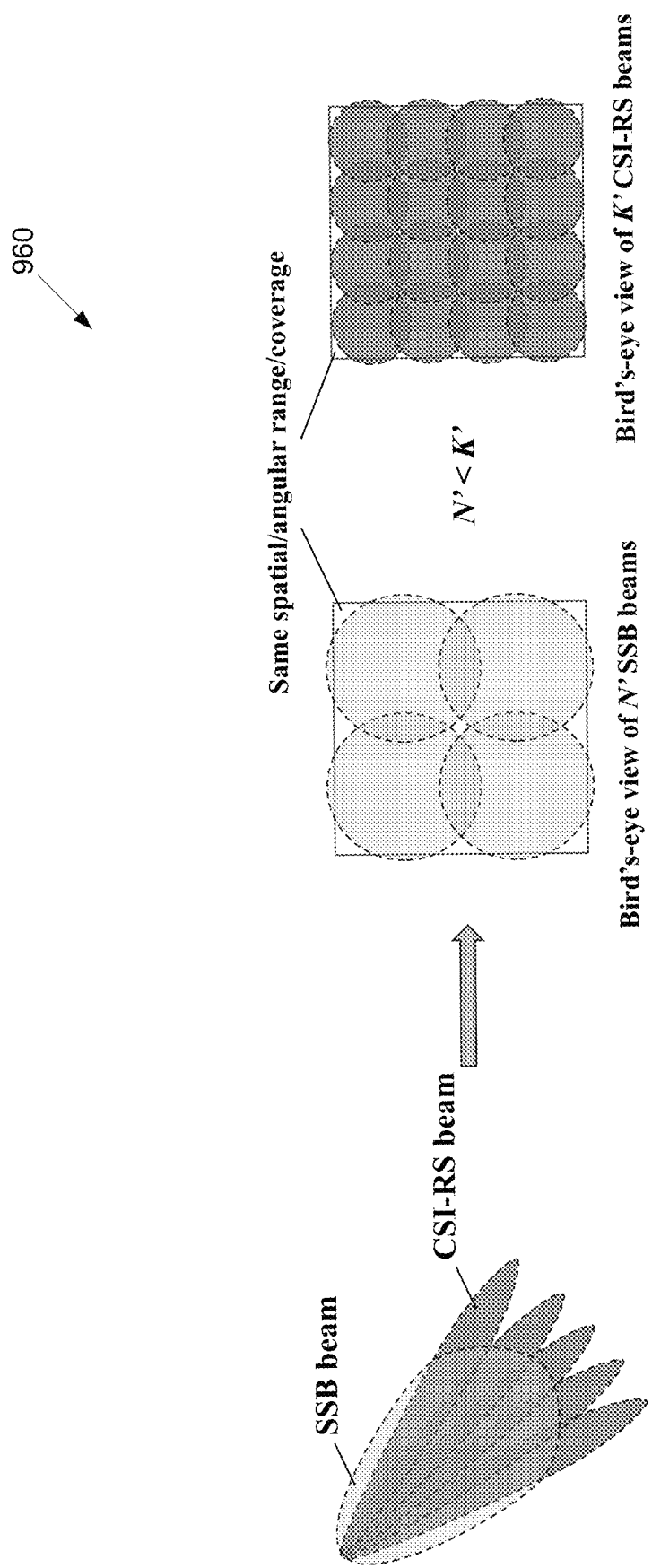
FIG. 9D illustrates an example stage-1 SSB beams and stage-2 CSI-RS beams in the two-stage beam acquisition according to embodiments of the present disclosure.

FIG. 9D illustrates an example stage-1 SSB beams and stage-2 CSI-RS beams in the two-stage beam acquisition 960 according to embodiments of the present disclosure. An embodiment of the stage-1 SSB beams and stage-2 CSI-RS beams in the two-stage beam acquisition 960 shown in FIG. 9D is for illustration only.

As illustrated in FIG. 9B and FIG. 9C, two examples are provided to illustrate the configurations of the stage-1 SSB beams and the stage-2 CSI-RS beams depicted in FIG. 9A assuming that the N' SSB beams and the K' CSI-RS beams cover the same spatial/angular range. As illustrated in FIG. 9B, the UE could be configured by the gNB different sets of SSB resources/beams (covering different spatial/angular ranges) to measure along the UE's moving trajectory.

For position A shown on the left-hand-side (LHS) in FIG. 9B, the UE could be configured by the network {SSB #1, ..., SSB #N'}. The UE could measure the L1-RSRPs of the N' SSB beams, and report to the network one or more SSBRIs along with their corresponding measured L1-RSRPs. Furthermore, the network could configure a different set of SSB beams {SSB #N', ..., SSB #N} for the UE to measure/monitor. In this case, the UE's position could have changed from position A to position B (shown on the right-hand-side (RHS) in FIG. 9B).

As shown in FIG. 9C, the UE at position A could also measure the CSI-RS resources/beams {CSI-RS #1, ..., CSI-RS #K'} for beam refinement. The CSI-RS beams/resources {CSI-RS #1, ..., CSI-RS #K'} could have the same spatial/angular coverage as the SSB beams/resources {SSB #1, ..., SSB #N'}.

Furthermore, as depicted on the LHS in FIG. 9D, a SSB beam could have a larger beamwidth than that of a CSI-RS beam such that one SSB beam could correspond to more than one CSI-RS beams to cover the same spatial/angular range.

For the two-stage beam acquisition design illustrated in FIG. 9A, FIG. 9B and FIG. 9C, as a total of N' SSB beams and K' CSI-RS beams are used/configured to cover the same spatial/angular range, it is evident that N' would be smaller than K' (N'<K') given that a SSB beam is wider/broader than a CSI-RS beam. This is depicted on the RHS in FIG. 9D as well, in which the bird's-eye views of the N' SSB beams and the K' CSI-RS beams are provided.

Figure 9E:
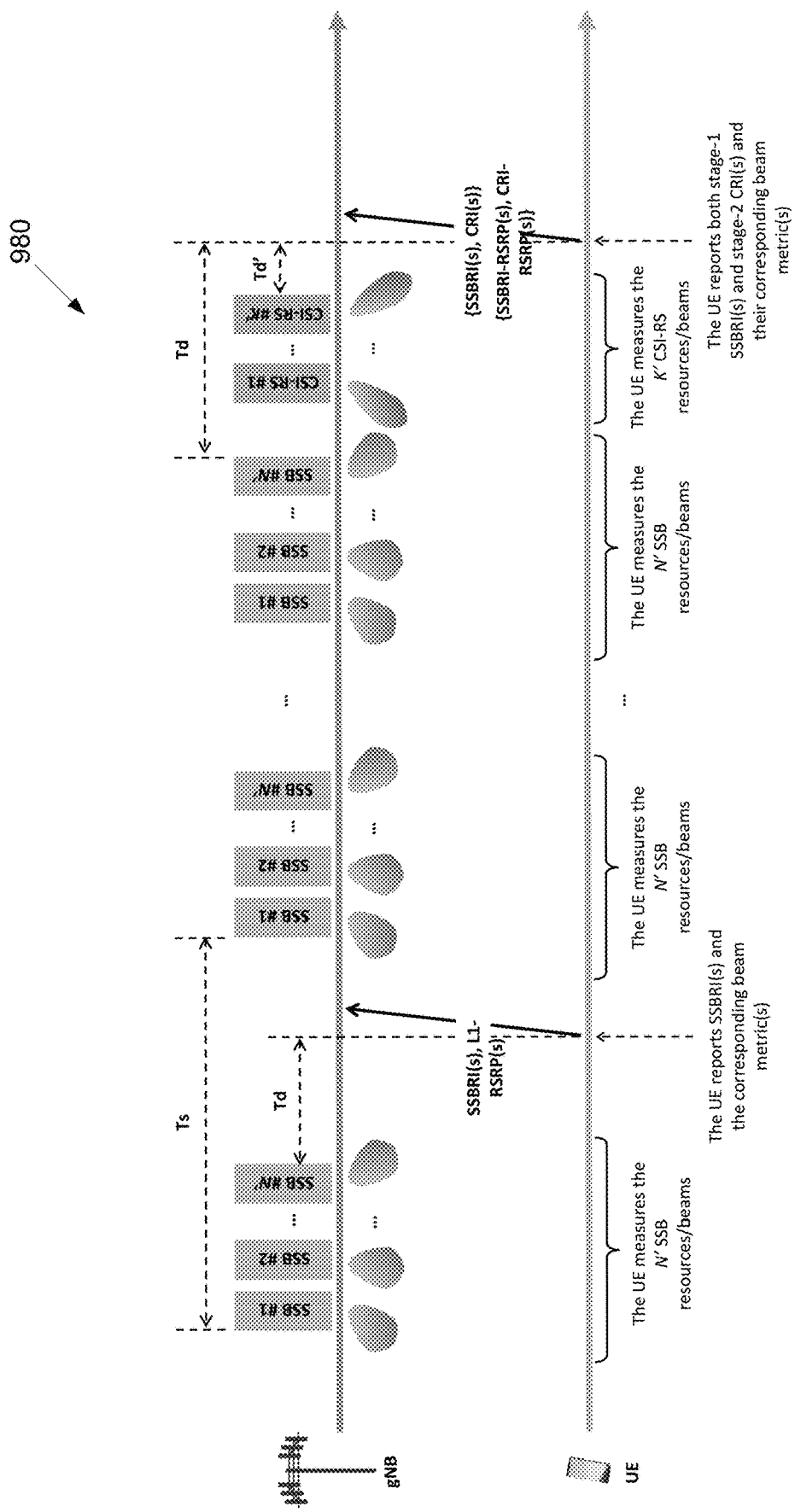
FIG. 9E illustrates another example two-stage beam acquisition and joint/mixed SSBRI/CRI reporting according to embodiments of the present disclosure.

FIG. 9E illustrates another example two-stage beam acquisition and joint/mixed SSBRI/CRI reporting 980 according to embodiments of the present disclosure. An embodiment of the two-stage beam acquisition and the joint/mixed SSBRI/CRI reporting 980 shown in FIG. 9E is for illustration only.

As illustrated in FIG. 9E, another example of reporting in a single reporting instance the resource indicators and the corresponding beam metrics for both stage-1 and stage-2 beam acquisition is presented. In this example, the N' SSB beams/resources configured at stage-1 and the K' CSI-RS beams/resources configured at stage-2 could cover different spatial/angular ranges.

As illustrated in FIG. 9E, the UE could be higher layer configured by the network (e.g., via higher layer RRC signaling) a set of SSB beams/resources {SSB #1, ..., SSB #N'} periodically transmitted from the gNB; here, the transmission periodicity is denoted by Ts. Furthermore, as depicted in FIG. 9E, the UE could also be configured by the network a set of K' CSI-RS beams/resources for beam refinement. As aforementioned, the CSI-RS beams/resources configured at stage-2 could cover a different spatial/angular range, say, range B, from that (say, range A) of the SSB beams/resources configured at stage-1.

In one example, the UE could report to the network the SSBRI(s) and the corresponding beam metric(s) obtained by measuring the SSB beams/resources configured at stage-1 Td slots/mini-slots/symbols after the UE has measured the last SSB resource/beam in the SSB burst (e.g., SSB #N' in a SSB burst), if the UE is not configured by the network to measure any stage-2 CSI-RS beams/resources in/during Td slots/mini-slots/symbols after the UE has measured the last SSB resource/beam in the SSB burst.

In another example, if the UE is configured by the network to measure one or more stage-2 CSI-RS beams/resources in/during Td slots/mini-slots/symbols after the UE has measured the last SSB resource/beam in the SSB burst, the UE could report to the network in the same reporting instance the SSBRI(s) (and therefore, the corresponding beam metric(s)) obtained by measuring the SSB beams/resources configured at stage-1 and the CRI(s) (and therefore, the corresponding beam metric(s)) obtained by measuring the CSI-RS beams/resources configured at stage-2, Td' slots/mini-slots/symbols after the UE has measured the last CSI-RS beam/resource in the CSI-RS resource set (e.g., CSI-RS beam/resource #K' in the CSI-RS resource set).

Figure 10:
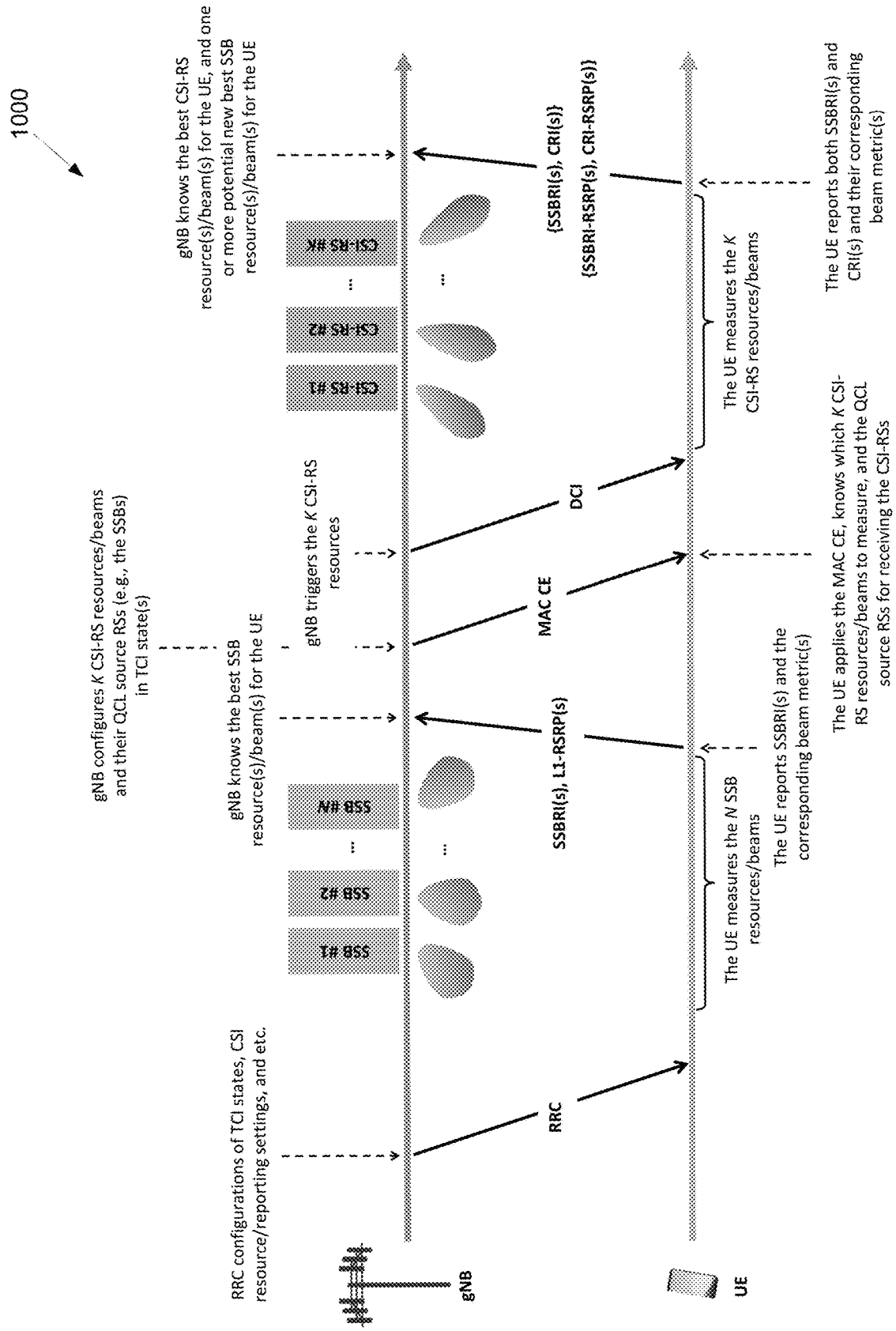
FIG. 10 illustrates yet another example two-stage beam acquisition and joint/mixed SSBRI/CRI reporting according to embodiments of the present disclosure.

FIG. 10 illustrates yet another example two-stage beam acquisition and joint/mixed SSBRI/CRI reporting 1000 according to embodiments of the present disclosure. An embodiment of the two-stage beam acquisition and joint/mixed SSBRI/CRI reporting 1000 shown in FIG. 10 is for illustration only.

As illustrated in FIG. 10, yet another example of reporting in the same reporting instance the SSBRI(s) and the CRI(s)—and therefore, the corresponding beam metric(s)—is presented. In this design example, at the first stage of beam acquisition, the UE could be first higher layer configured by the network (e.g., via higher layer RRC signaling) a set of N SSB resources/beams; the UE could then measure the configured N SSB resources/beams, and report to the network one or more SSBRIs and their corresponding beam metrics. At stage-2, the UE could be first higher layer configured by the network (e.g., via higher layer RRC signaling) a set of CSI-RS resources/beams; the UE could then receive from the network a MAC CE activation command activating a set of K CSI-RS resources/beams from the higher layer configured set of CSI-RS resources/beams; the UE could further receive from the network a DCI (e.g., in form of DCI format 1_0) to trigger the measurement and reporting of the K CSI-RS resources/beams.

Upon receiving the DCI triggering, the UE could measure the K CSI-RS resources/beams; the UE could report in the same reporting instance one or more SSBRIs and one or more CRIs (and therefore, their corresponding beam metrics). Here, the SSBRI(s) reported at the end of stage-2 could be different from the SSBRI(s) reported at the end of stage-1 of beam acquisition.

It is evident from FIG. 9A, FIG. 9E and FIG. 10 that enhancements to the 3GPP NR CSI framework, e.g., the CSI resource setting, are needed to enable reporting different types of resource indicators (e.g., SSBRI and CRI) in the same reporting instance/CSI-Report. In the 3GPP NR, a UE can be configured with P≥1 CSI reporting settings (i.e., CSI-ReportConfigs), M≥1 resource settings (i.e., CSI-ResourceConfigs), and one CSI measurement setting, where the CSI measurement setting includes L≥1 measurement links (i.e., CSI-MeasLinkConfigs).

At least the following configuration parameters are signaled via RRC for CSI acquisition: (1) P, M, and L are indicated either implicitly or explicitly; (2) in each CSI reporting setting, at least the following are included: reported CSI parameter(s) such as RI, PMI, CQI, CSI type if reported such as Type I or Type II, a codebook configuration including codebook subset restriction, time domain behavior such as P-CSI, SP-CSI, or A-CSI, frequency granularity for CQI and PMI such as wideband, partial band, or sub-band, and/or measurement restriction configurations such as RBs in frequency domain and slots in the time domain; (3) in each CSI-RS resource setting: a configuration of $S_i$≥CSI-RS resource set(s), a configuration of $K_s$≥1 CSI-RS resources for each resource set s, including at least: mapping to REs, the number of antenna ports, time domain behavior, etc., and/or time domain behavior: aperiodic, periodic, or semi-persistent; (4) in each of the L links in CSI measurement setting: CSI reporting setting indication, resource setting indication, quantity to be measured (either channel or interference), one CSI reporting setting can be linked with one or multiple resource settings, and/or multiple CSI reporting settings can be linked to one resource setting.

Figure 11:
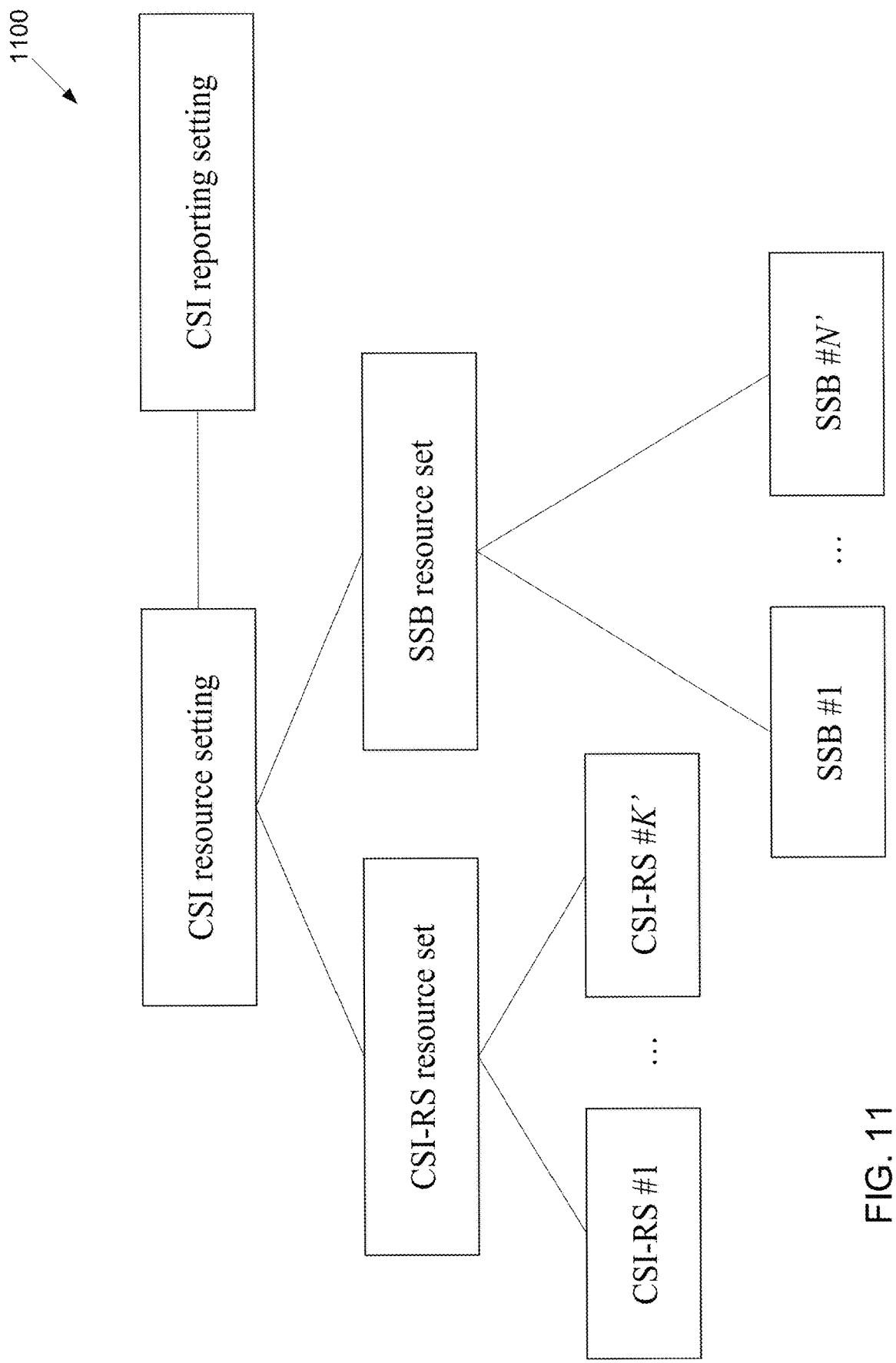
FIG. 11 illustrates an example CSI resource configuration for the two-stage beam acquisition according to embodiments of the present disclosure.

FIG. 11 illustrates an example CSI resource configuration 1100 for the two-stage beam acquisition according to embodiments of the present disclosure. An embodiment of the CSI resource configuration 1100 for the two-stage beam acquisition shown in FIG. 11 is for illustration only.

In FIG. 11, one design example of CSI framework for the two-stage beam acquisition illustrated in FIG. 9A is presented. As shown in FIG. 11, one CSI resource setting could include/comprise two RS resource sets. In this design example, one RS resource set corresponds to a CSI-RS resource set (e.g., comprising K' CSI-RS resources/beams {CSI-RS #1, CSI-RS #2, . . . , CSI-RS #K'} as depicted in FIG. 9A) and the other RS resource set corresponds to a SSB resource set (e.g., comprising N' SSB resources/beams {SSB #1, SSB #2, . . . , SSB #N'} as depicted in FIG. 9A). The two different RS resource sets configured in the same CSI resource setting could have different time domain behaviors.

Figure 12:
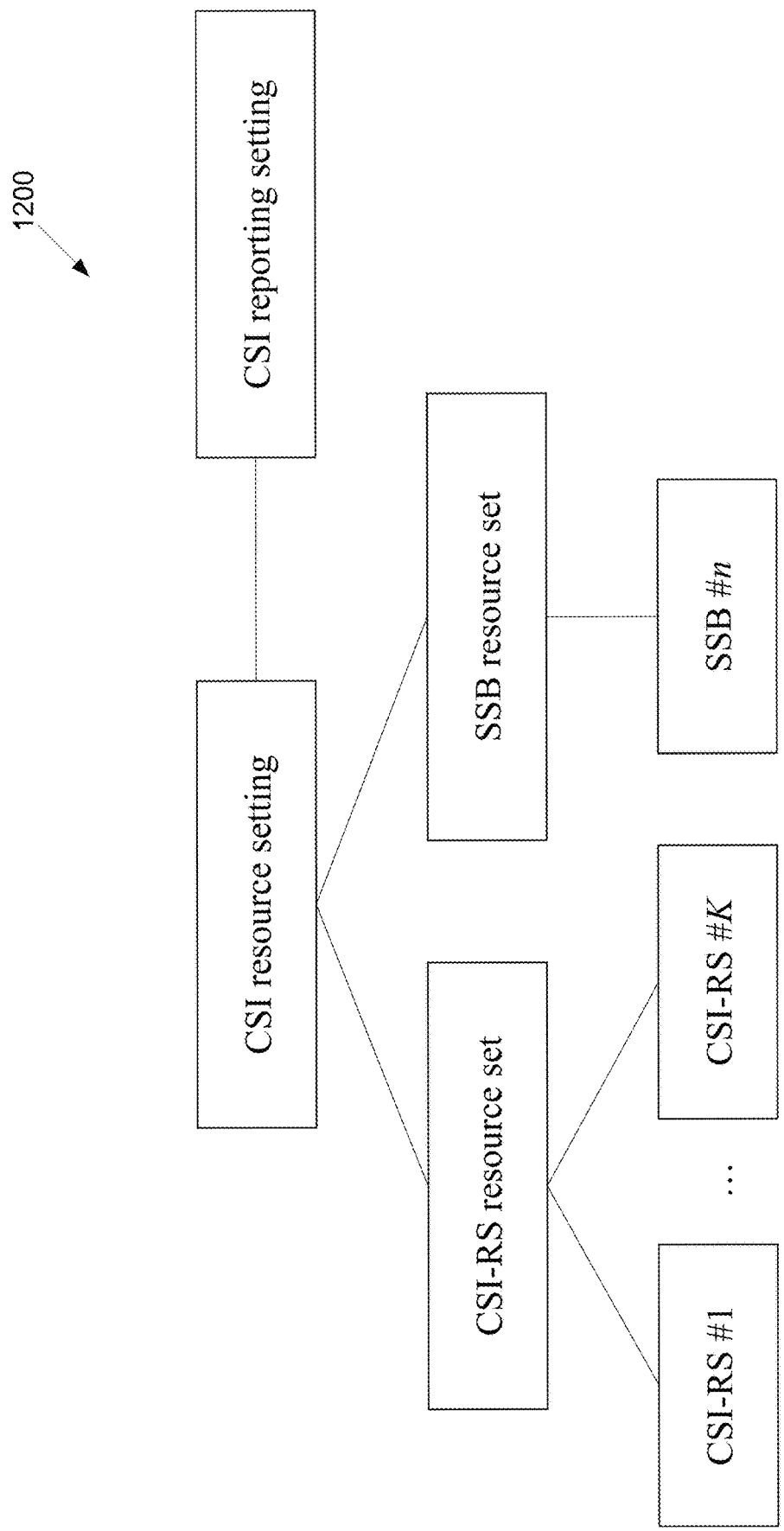
FIG. 12 illustrates another example CSI resource configuration for the two-stage beam acquisition according to embodiments of the present disclosure.

FIG. 12 illustrates another example CSI resource configuration 1200 for the two-stage beam acquisition according to embodiments of the present disclosure. An embodiment of the CSI resource configuration 1200 for the two-stage beam acquisition shown in FIG. 12 is for illustration only.

In FIG. 12, another design example of CSI framework for the two-stage beam acquisition illustrated in FIG. 10 is presented. Different from the design example shown in FIG. 11, the SSB resource set in FIG. 12 could include/comprise only one SSB resource, denoted by SSB #n (n∈{1, 2, . . . , N}). Furthermore, in FIG. 12, the CSI-RS resource set comprises K CSI-RS resources {CSI-RS #1, CSI-RS #2, . . . , CSI-RS #K} as depicted in FIG. 10.

Figure 13:
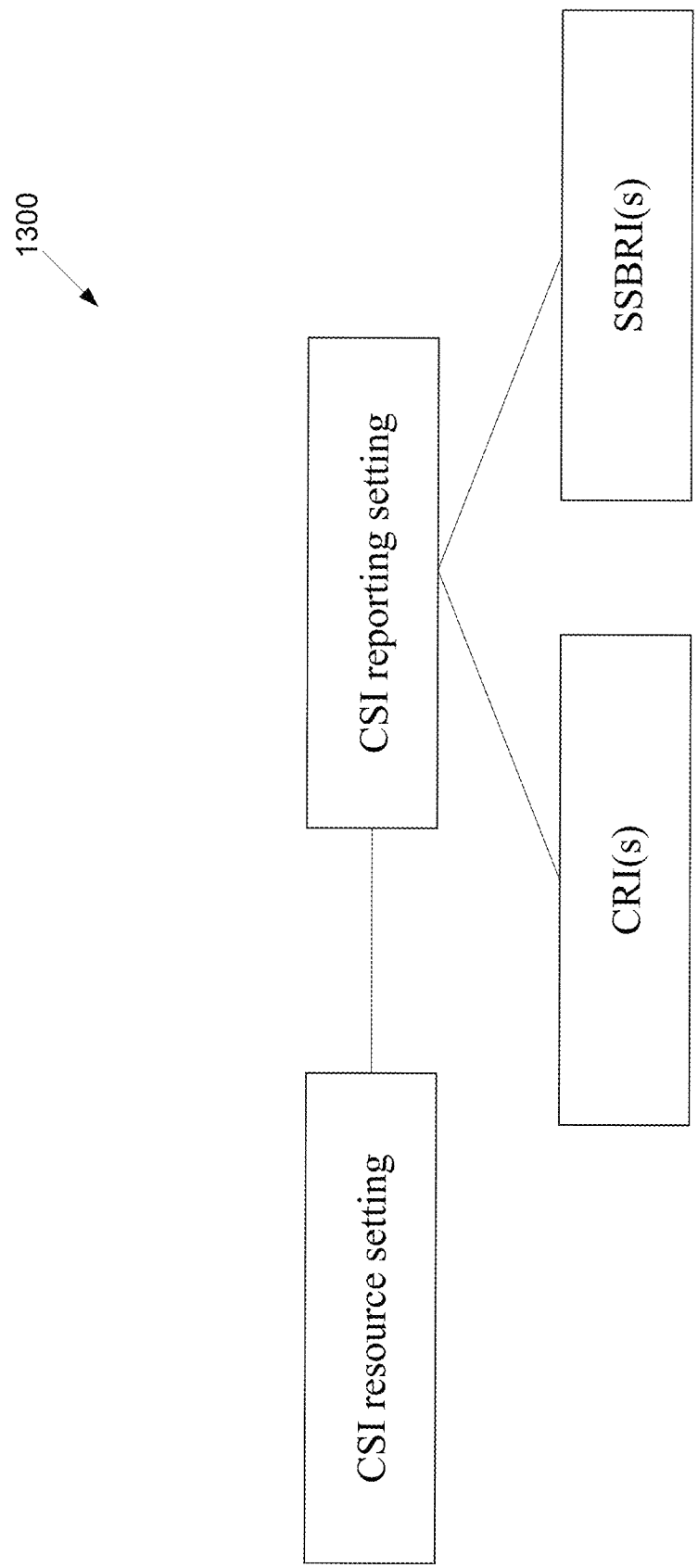
FIG. 13 illustrates an example CSI reporting setting for the two-stage beam acquisition according to embodiments of the present disclosure.

FIG. 13 illustrates an example CSI reporting setting 1300 for the two-stage beam acquisition according to embodiments of the present disclosure. An embodiment of the CSI reporting setting 1300 for the two-stage beam acquisition shown in FIG. 13 is for illustration only.

Furthermore, one CSI reporting setting could configure two different types of resource indicators, i.e., CRI(s) and SSBRI(s) (and therefore, their corresponding beam metrics) to be reported in the same reporting instance/CSI-Report (see FIG. 13).

The UE could be indicated by the network whether to report/mix SSBRI(s) (and therefore, the corresponding beam metric(s)) and CRI(s) (and therefore, the corresponding beam metric(s)) in the same (CSI) reporting instance/CSI-Report, wherein the SSBRI(s) (and therefore, the corresponding beam metric(s)) could be obtained by measuring the SSB resource(s)/beam(s) configured at the first stage of beam acquisition and the CRI(s) (and therefore, the corresponding beam metric(s)) could be obtained by measuring the CSI-RS resource(s)/beam(s) configured at the second stage of beam acquisition; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, a higher layer parameter groupBased-SsbriCriBeamReporting could be included/incorporated in CSI reporting setting, e.g., in the higher layer parameter CSI-ReportConfig, to turn/off mixed SSBRI(s) and CRI(s) reporting in the same reporting instance/CSI-Report. If the UE is configured with the higher layer parameter groupBasedSsbriCriBeamReporting set to 'enabled', the UE shall report in a single reporting instance both the SSBRI(s) and CRI(s) (and therefore, the corresponding beam metrics). The SSBRI(s) and CRI(s) reported in the same reporting instance could be obtained via the two-stage beam acquisition process such as the design examples shown in FIG. 9A, FIG. 9E and FIG. 10.

In another example, if the number of network configured SSBRIs to report or the number of network configured CRIs to report or the total number of network configured SSBRIs and CRIs to report is greater than or equal to or smaller than a threshold (denoted by th_mix), the UE shall report in a single reporting instance both the SSBRI(s) and CRI(s) (and therefore, the corresponding beam metrics). The SSBRI(s) and CRI(s) reported in the same reporting instance could be obtained via the two-stage beam acquisition process such as the design examples shown in FIG. 9A, FIG. 9E and FIG. 10.

The threshold th_mix could be a fixed value in the specifications, e.g., 2. Alternatively, the UE could be indicated by the network the threshold th_mix; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_mix. For another example, the UE could be first higher layer RRC configured by the network a list of candidate values for the threshold th_mix. The UE could then receive from the network a MAC CE activation command/bitmap to activate one value from the list of candidate values for th_mix as the threshold th_mix.

In yet another example, if the UE is indicated/configured by the network to use differential RSRP reporting, the UE shall report in a single reporting instance both the SSBRI(s) and CRI(s) (and therefore, the corresponding beam metrics). The SSBRI(s) and CRI(s) reported in the same reporting instance could be obtained via the two-stage beam acquisition process such as the design examples shown in FIG. 9A, FIG. 9E and FIG. 10.

Alternatively, the UE could autonomously determine whether to report/mix SSBRI(s) (and therefore, the corresponding beam metric(s)) and CRI(s) (and therefore, the corresponding beam metric(s)) in the same (CSI) reporting instance/CSI-Report, wherein the SSBRI(s) (and therefore, the corresponding beam metric(s)) could be obtained by measuring the SSB resource(s)/beam(s) configured at the first stage of beam acquisition and the CRI(s) (and therefore, the corresponding beam metric(s)) could be obtained by measuring the CSI-RS resource(s)/beam(s) configured at the second stage of beam acquisition.

The UE could report to the network the indication in part of the beam/CSI report or multiplexed with HARQ-ACK or multiplexed with scheduling request (SR) or via higher layer signaling such as MAC CE. For instance, the UE could send to the network a one-bit indicator to indicate whether the resource indicators reported in the same reporting instance are a mix of both SSBRI(s) and CRI(s) or not. Various design examples are presented as follows.

In one example, a parameter (termed, e.g. Report-Type indication) that indicates whether only SSBRI(s) or both SSBRI(s) and CRI(s) are included in the CSI/beam report can be included as a part of the respective UCI. If this CSI report is aperiodic and transmitted via PUSCH, a two-part UCI can be used wherein the Report-Type indication parameter is included in the first part of the UCI.

In another example, a parameter (termed, e.g. Report-Type indication) that indicates whether only CRI(s) or both SSBRI(s) and CRI(s) are included in the CSI/beam report can be included as a part of the respective UCI. If this CSI report is aperiodic and transmitted via PUSCH, a two-part UCI can be used wherein the Report-Type indication parameter is included in the first part of the UCI.

In yet another example, a parameter (termed, e.g. Report-Type indication) that indicates whether only SSBRI(s) or only CRI(s) or both SSBRI(s) and CRI(s) are included in the CSI/beam report can be included as a part of the respective UCI. If this CSI report is aperiodic and transmitted via PUSCH, a two-part UCI can be used wherein the Report-Type indication parameter is included in the first part of the UCI.

Figure 14:
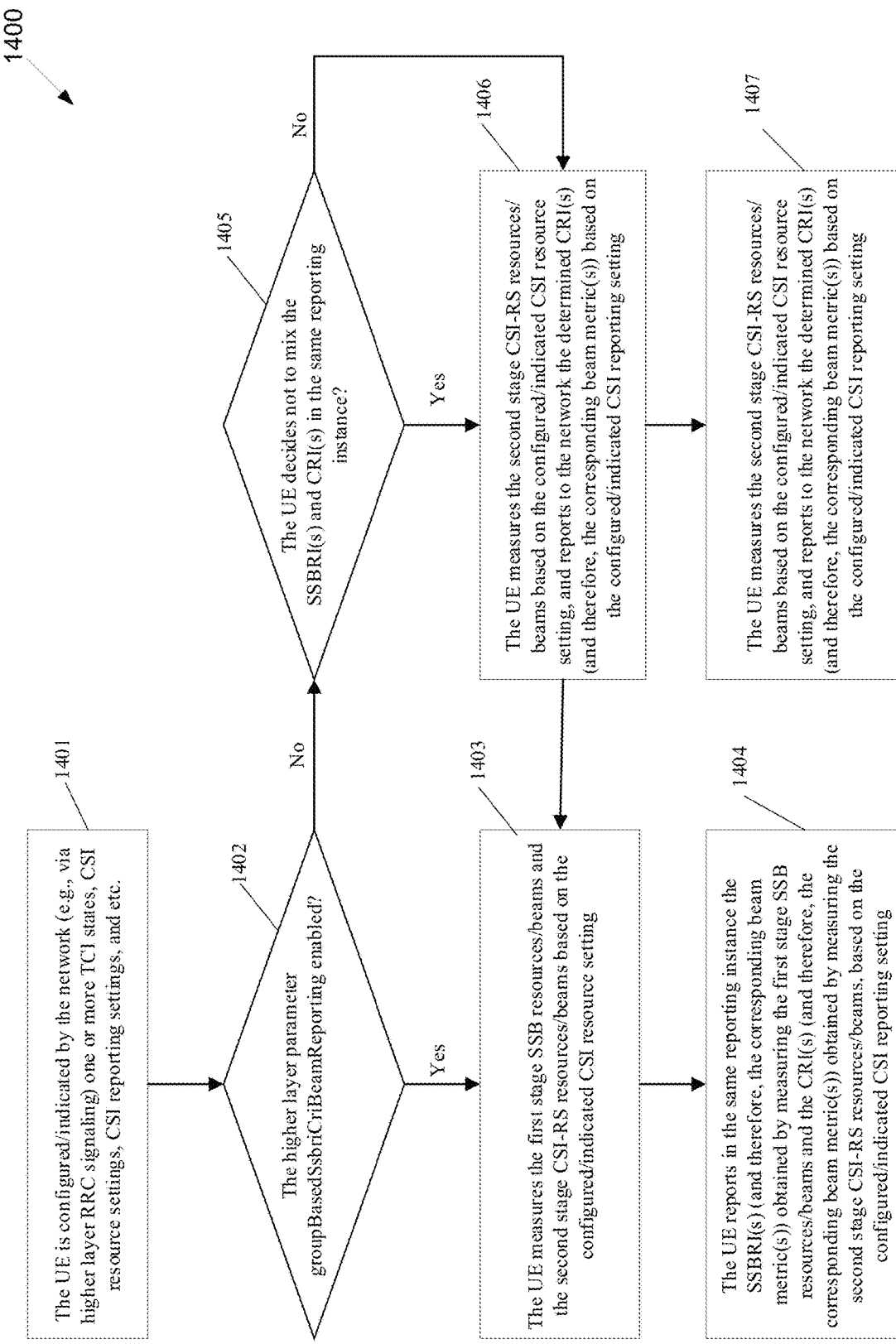
FIG. 14 illustrates a flowchart of a method for network-configured or UE-initiated joint/mixed SSBRI/CRI reporting procedure according to embodiments of the present disclosure.

In FIG. 14, an example of network-configured or UE-initiated joint/mixed SSBRI/CRI reporting procedure is illustrated.

FIG. 14 illustrates a flowchart of a method 1400 for network-configured and UE-initiated joint/mixed SSBRI/CRI reporting procedure according to embodiments of the present disclosure. The method 1400 as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, in 1401, the UE is first configured/indicated by the network (e.g., via higher layer RRC signaling) one or more TCI states, CSI resource settings, CSI reporting settings and other necessary system information. The CSI resource setting(s) and CSI reporting setting(s) could be based on the existing CSI framework in NR, or the CSI framework(s) illustrated in FIG. 11, FIG. 12 and FIG. 13 in the present disclosure.

As illustrated in FIG. 14, in 1402, if the higher layer parameter groupBasedSsbriCriBeamReporting in CSI-ReportConfig is configured as 'enabled', the procedure would proceed to 1403. Otherwise ('disabled'), the procedure would go to 1405.

In 1403, the UE measures the SSB resources/beams configured at the first stage of beam acquisition and the CSI-RS resources/beams configured at the second stage of beam acquisition based on the configured/indicated CSI resource setting(s). Accordingly, the UE could determine one or more SSBRIs based the beam metric(s) such as L1-RSRP(s) measured from the first stage SSBs, and one or more CRIs based on the beam metric(s) such as L1-RSRP(s) measured from the second stage CSI-RSs.

In 1404, the UE reports in the same reporting instance the SSBRI(s) (and therefore, the corresponding beam metric(s) such as L1-RSRP(s))—obtained in 1403, and the CRI(s) (and therefore, the corresponding beam metric(s) such as L1-RSRP(s))—obtained in 1403, based on the configured/indicated CSI reporting setting.

In 1405, the UE autonomously determines whether to report in the same reporting instance different types of resource indicators such as SSBRI(s) and CRI(s).

In 1406, if the UE decides not to report/mix SSBRI(s) and CRI(s) in the same reporting instance/CSI-Report, the UE measures the SSB resources/beams configured at the first stage of beam acquisition, and reports to the network one or more SSBRIs (and therefore, the corresponding beam metric(s)) determined from measuring the stage-1 SSBs.

In 1407, if the UE decides not to report/mix SSBRI(s) and CRI(s) in the same reporting instance/CSI-Report, the UE measures the CSI-RS resources/beams configured at the second stage of beam acquisition, and reports to the network one or more CRIs (and therefore, the corresponding beam metric(s)) determined from measuring the stage-2 CSI-RSs. The (CSI) reporting instance in 1407 shall be different from that in 1406.

As aforementioned, for the two-stage beam acquisition design, the UE could report in a single CSI reporting instance/CSI-Report, $N\_ssbri \geq 1$ SSBRIs (and therefore, their corresponding $N\_ssbri$ beam metrics such as L1-RSRPs) and $N\_cri \geq 1$ CRIs (and therefore, their corresponding $N\_cri$ beam metrics such as L1-RSRPs).

The UE could determine the $N\_ssbri \geq 1$ SSBRIs (and therefore, their corresponding $N\_ssbri$ beam metrics such as L1-RSRPs) based on the measurements of the SSB resources/beams configured at the first stage of beam acquisition, and the UE could determine the $N\_cri \geq 1$ CRIs (and therefore, their corresponding $N\_cri$ beam metrics such as L1-RSRPs) based on the measurements of the CSI-RS resources/beams configured at the second stage of beam acquisition.

The value(s) of $N\_ssbri$ or $N\_cri$ could be configured/indicated by the network, or the UE, or both of the network and the UE. Various configuration/indication methods are presented as follows.

In one method (Method-1), the UE could be indicated/configured by the network the value(s) of $N\_ssbri$ or $N\_cri$. In one example 1.1, the UE could be indicated by the network the number of beam reports $N\_ssbri$ for stage-1 beam acquisition, and the number of beam reports $N\_cri$ for stage-2 beam acquisition. In another example 1.2, the UE could be indicated by the network the number of beam reports $N\_ssbri$ for stage-1 beam acquisition, and the total number of beam reports $N\_tot$ for both stage-1 and stage-2 beam acquisition; $N\_tot=N\_ssbri+N\_cri$. In yet another example 1.3, the UE could be indicated by the network the number of beam reports $N\_cri$ for stage-2 beam acquisition, and the total number of beam reports $N\_tot$ for both stage-1 and stage-2 beam acquisition; $N\_tot=N\_ssbri+N\_cri$. In yet another example 1.4, the UE could be indicated by the network only the total number of beam reports $N\_tot$ for both stage-1 and stage-2 beam acquisition.

The indication of $N\_ssbri$ or $N\_cri$ or $N\_tot$ could be via higher layer (RRC) or/and MAC CE or/and DCI based signaling or/and any combination of at least two of RRC, MAC CE and DCI based signaling; this indication could be via a separate (dedicated) parameter or joint with another parameter.

For example, the value of $N\_ssbri$ or $N\_cri$ or $N\_tot$ is fixed in the specification. For another example, the UE could be higher layer configured by the network (e.g., via higher layer RRC signaling CSI-ReportConfig) the exact value of $N\_ssbri$ or $N\_cri$ or $N\_tot$. Yet for another example, the UE could be first higher layer configured by the network (e.g., via higher layer RRC signaling CSI-ReportConfig) a list/set/pool of candidate values for $N\_ssbri$ or $N\_cri$ or $N\_tot$. The UE could then receive from the network a MAC CE activation command/bitmap to activate one value from the list/set/pool of candidate values for $N\_ssbri/N\_cri/N\_tot$ as $N\_ssbri/N\_cri/N\_tot$.

In another method (Method-2), the UE could autonomously determine the value(s) of $N\_ssbri$ or $N\_cri$, and report to the network one or more of them in part of the beam/CSI report or multiplexed with HARQ-ACK or multiplexed with scheduling request (SR) or via higher layer signaling such as MAC CE. In one example 2.1, the UE could report to the network the number of beam reports N_ssbri for stage-1 beam acquisition, and the number of beam reports N_cri for stage-2 beam acquisition. In another example 2.2, the UE could report to the network the number of beam reports N_ssbri for stage-1 beam acquisition, and the total number of beam reports N_tot for both stage-1 and stage-2 beam acquisition; N_tot=N_ssbri+N_cri. In yet another example 2.3, the UE could report to the network the number of beam reports N_cri for stage-2 beam acquisition, and the total number of beam reports N_tot for both stage-1 and stage-2 beam acquisition; N_tot=N_ssbri+N_cri. In yet another example 2.4, the UE could report to the network only the total number of beam reports N_tot for both stage-1 and stage-2 beam acquisition.

In yet another example (Method-3), both the network and the UE could configure one or more of the values of N_ssbri or N_cri or N_tot. If certain value(s) of N_ssbri or N_cri or N_tot is determined/configured by the network, the corresponding configuration/indication methods could follow those specified in Method-1 in the present disclosure (e.g., examples 1.1, 1.2, 1.3 or 1.4). If certain value(s) of N_ssbri or N_cri or N_tot is determined/configured by the UE, the UE shall report to the network the determined value(s) in part of the beam/CSI report or multiplexed with HAQR-ACK or multiplexed with SR, following those specified in Method-2 in the present disclosure (e.g., examples 2.1, 2.2, 2.3 or 2.4).

Various resource indicators ordering schemes and differential reporting strategies for the joint/mixed SSBRI/CRI reporting are presented as follows.

In one scheme (Scheme-0), the ordering of the SSBRI(s) and CRI(s) (and therefore, the corresponding beam metrics) in a reporting instance/CSI-Report is fixed in the system specifications. If differential RSRP reporting is enabled, the UE could indicate the network the reference RSRP value (e.g., the largest measured RSRP value) or the (reference) position in the reporting instance/CSI-Report associated with the reference RSRP value. Alternatively, if differential RSRP reporting is enabled, the (reference) position in the reporting instance/CSI-Report can be fixed, e.g. to the $1^{st}$ beam report or $1^{st}$ position in the reporting instance/CSI-Report.

For example, the first N_ssbri resource indicators (and therefore, the corresponding N_ssbri beam metrics) reported in the CSI reporting instance shall correspond to the N_ssbri SSBRIs (and therefore, the corresponding N_ssbri beam metrics). Furthermore, the remaining resource indicators (and therefore, the corresponding beam metrics) reported in the same reporting instance/CSI-Report, shall correspond to the N_cri CRIs (and therefore, the corresponding N_cri beam metrics).

For another example, the first N_cri resource indicators (and therefore, the corresponding N_cri beam metrics) reported in the CSI reporting instance shall correspond to the N_cri CRIs (and therefore, the corresponding N_cri beam metrics). Furthermore, the remaining resource indicators (and therefore, the corresponding beam metrics) reported in the same reporting instance/CSI-Report, shall correspond to the N_ssbri SSBRIs (and therefore, the corresponding N_ssbri beam metrics).

In another scheme (Scheme-1), the network or the UE or both of the network and the UE could first determine/configure the ordering of the SSBRI(s) and CRI(s) (and therefore, the corresponding beam metrics) in a reporting instance/CSI-Report. If differential RSRP reporting is enabled, the UE could indicate the network the reference RSRP value (e.g., the largest measured RSRP value) or the (reference) position in the reporting instance/CSI-Report associated with the reference RSRP value. Alternatively, if differential RSRP reporting is enabled, the (reference) position in the reporting instance/CSI-Report can be fixed, e.g. to the $1^{st}$ beam report or $1^{st}$ position in the reporting instance/CSI-Report. Various design methods are presented as follows.

In one method (Method-1.1), the UE could be indicated/configured by the network the ordering of the SSBRI(s) and CRI(s) (and therefore, the corresponding beam metrics) in a reporting instance/CSI-Report; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example 1.1.0, the UE could be explicitly indicated by the network the exact ordering of the SSBRI(s) and CRI(s) (and therefore, the corresponding beam metrics) reported in the same reporting instance/CSI-Report. For instance, for N_ssbri=2 (denoted by ssbri_0 and ssbri_1) and N_cri=1 (denoted by cri_0), the UE could be indicated by the network to order the reported resource indicators in the same CSI reporting instance as {ssbri_0, cri_0, ssbri_1}.

In another example 1.1.1, the UE could be first indicated by the network the exact position(s)/ordering of the SSBRI(s)/CRI(s) (and therefore, the corresponding beam metric(s)) in the CSI reporting instance. For instance, the UE could be indicated by the network that the first N_ssbri/N_cri resource indicators (and therefore, the corresponding N_ssbri/N_cri beam metrics) reported in the CSI reporting instance shall correspond to the N_ssbri/N_cri SSBRIs/CRIs (and therefore, the corresponding N_ssbri/N_cri beam metrics). Furthermore, the UE could be indicated by the network that the remaining resource indicators (and therefore, the corresponding beam metrics) in the same reporting instance/CSI-Report, shall correspond to the N_cri/N_ssbri CRIs/SSBRIs (and therefore, the corresponding N_cri/N_ssbri beam metrics).

In yet another example 1.1.2, the UE could receive from the network at least one MAC CE command/bitmap to indicate the exact position(s)/ordering of the SSBRI(s) and CRI(s) (and therefore, the corresponding beam metrics) in the same CSI reporting instance/CSI-Report. For instance, for N_ssbri=2 (denoted by ssbri_0 and ssbri_1) and N_cri (denoted by cri_0), the UE could be indicated by the network a bitmap [1 0 1] with the bit position '1' corresponding to a SSBRI and '0' corresponding to a CRI. Following the indicated bitmap, the UE could order the reported resource indicators in the same CSI reporting instance as {ssbri_0, cri_0, ssbri1}.

In yet another example 1.1.3, at least two of the aforementioned design examples 1.1.0 or 1.1.1 or 1.1.2 could be used to determine the position(s)/ordering of the SSBRI(s) and CRI(s) (and therefore, the corresponding beam metrics) in the same reporting instance/CSI-Report.

In yet another example 1.1.4, the UE could be first indicated by the network one or more reference positions/ordering in the reporting instance/CSI-Report. For instance, the reference position(s)/ordering in the reporting instance/CSI-Report could be used to send the resource indicator(s) with the largest (or the smallest) measured L1-RSRP. The indication of the reference position(s)/ordering in the CSI reporting instance/CSI-Report could be via higher layer (RRC) or/and MAC CE or/and DCI based signaling or/and any combination of at least two of RRC, MAC CE and DCI based signaling; this indication could be via a separate (dedicated) parameter or joint with another parameter.

For instance, the UE could receive from the network a bitmap (or a MAC CE command) with each bit position in the bitmap corresponding to a position/ordering in the CSI reporting instance/CSI-Report. If a bit position in the bitmap is enabled, e.g., set to '1', the corresponding position in the CSI reporting instance/CSI-Report is then configured as the reference position/ordering. The ordering of the SSBRI(s) and CRI(s) (and therefore, the corresponding beam metrics) for the rest of the position(s) other than the reference position(s) in the same CSI reporting instance/CSI-Report could follow those specified in the design examples 1.1.0, 1.1.1, 1.1.2, or 1.1.3.

In another method (Method-1.2), the UE could autonomously determine the ordering of the SSBRI(s) and CRI(s) (and therefore, the corresponding beam metrics) reported in the same reporting instance/CSI-Report; the UE could indicate the network the determined ordering of the SSBRI(s) and CRI(s) (and therefore, the corresponding beam metrics) in the reporting instance/CSI-Report; furthermore, the UE could report to the network the indication in part of the beam/CSI report or multiplexed with HARQ-ACK or multiplexed with scheduling request (SR) or via higher layer signaling such as MAC CE.

In one example 1.2.0, the UE could explicitly indicate the network the exact ordering of the SSBRI(s) and CRI(s) (and therefore, the corresponding beam metrics) reported in the same reporting instance/CSI-Report. For instance, for N_ssbri=2 (denoted by ssbri_0 and ssbri_1) and N_cri=1 (denoted by cri_0), the UE could first determine the ordering of the reported resource indicators in the same CSI reporting instance as, e.g. {ssbri_0, cri_0, ssbri_1}; the UE could then indicate the network the determined ordering.

In yet another example 1.2.1, the UE could first determine the position(s)/ordering of the SSBRI(s) and CRI(s) (and therefore, the corresponding beam metrics) in the CSI reporting instance and indicate the network the determined ordering.

For instance, the UE could indicate the network that the first N_ssbri/N_cri resource indicators (and therefore, the corresponding N_ssbri/N_cri beam metrics) reported in the CSI reporting instance/CSI-Report correspond to the N_ssbri/N_cri SSBRIs/CRIs (and therefore, the corresponding N_ssbri/N_cri beam metrics). Furthermore, the UE could indicate the network that the remaining resource indicators (and therefore, the corresponding beam metrics) in the same reporting instance/CSI-Report, shall correspond to the N_cri/N_ssbri CRIs/SSBRIs (and therefore, the corresponding N_cri/N_ssbri beam metrics).

In yet another example 1.2.2, the UE could send to the network at least one MAC CE/bitmap to indicate the exact position(s)/ordering of the SSBRI(s) and CRI(s) (and therefore, the corresponding beam metrics) in the CSI reporting instance/CSI-Report. For instance, for N_ssbri=2 (denoted by ssbri_0 and ssbri_1) and N_cri=1 (denoted by cri_0). The UE could send to the network a bitmap [1 0 1] with the bit position '1' corresponding to a SSBRI and '0' corresponding to a CRI. The bitmap indicates the positions/ordering of the reported resource indicators in the same CSI reporting instance as {ssbri_sc_0, ssbri_nsc_0, ssbri_sc_1}.

In yet another example 1.2.3, at least two of the aforementioned design examples 1.2.0 or 1.2.1 or 1.2.2 could be used to determine the ordering of the SSBRI(s) and CRI(s) (and therefore, the corresponding beam metrics) reported in the same reporting instance/CSI-Report.

In yet another method (Method-1.3), both the network and the UE could determine the ordering of the SSBRI(s) and CRI(s) (and therefore, the corresponding beam metrics) in a reporting instance/CSI-Report. That is, the UE could be indicated/configured by the network the ordering of one or more of the SSBRI(s) and CRI(s) (and therefore, the corresponding beam metrics) following those specified in Method-1.1; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Furthermore, the UE could autonomously determine the ordering of the remaining SSBRI(s) and CRI(s) (and therefore, the corresponding beam metrics) in the same reporting instance/CSI-Report; the UE could indicate the network the determined ordering of the resource indicators (and therefore, the corresponding beam metrics) in the reporting instance/CSI-Report; the UE could report to the network the indication in part of the beam/CSI report or multiplexed with HARQ-ACK or multiplexed with scheduling request (SR) or via higher layer signaling such as MAC CE.

As aforementioned, for both Scheme-0 and Scheme-1 based mechanisms to order the SSBRI(s) and CRI(s) (and therefore, the corresponding beam metrics) in a single reporting instance/CSI-Report, the differential RSRP reporting could be enabled. There could be various means or conditions to configure/indicate/enable the differential RSRP reporting for the mixed SSBRI/CRI reporting, which are presented as follows.

In one option (Option-I), the UE could be indicated by the network to report the differential RSRP value(s) for the mixed SSBRI/CRI reporting; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Optionally, the UE could receive from the network an indicator (e.g., a two-bit indicator) to indicate whether the differential RSRP reporting for the mixed SSBRI/CRI reporting shall be applied jointly to both the SS-RSRP(s) and CSI-RSRP(s), only the SS-RSRP(s), only the CSI-RSRP(s), or separately to the SS-RSRP(s) and CSI-RSRP(s). For instance, the UE could receive from the network a one-bit indicator with '1'—applied jointly to both the SS-RSRP(s) and CSI-RSRP(s) and '0'—applied to only the CSI-RSRP(s).

In one example I.1, the UE shall use the differential RSRP reporting for the mixed SSBRI/CRI reporting if the higher layer parameter groupBasedSsbriCriBeamReporting in CSI-ReportConfig is set to 'enabled'. As aforementioned, the higher layer parameter groupBasedSsbriCriBeamReporting is used to turn on/off reporting different types of resource indicators such as SSBRI(s) and CRI(s) in the same reporting instance.

In another example I.2, the UE shall use the differential RSRP reporting for the mixed SSBRI/CRI reporting if the total number of network configured SSB resources/beams to measure (i.e., N_ssbri) is greater than or equal to a threshold, denoted by th_Nssbri.

The threshold th_Nssbri could be a fixed value in the specifications, e.g., 1. Alternatively, the UE could be indicated by the network the threshold th_Nssbri; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_Nssbri. For another example, the UE could be first higher layer RRC configured by the network a list of candidate values for the threshold th_Nssbri. The UE could then receive from the network a MAC CE activation command/bitmap to activate one value from the list of candidate values for th_Nssbri as the threshold th_Nssbri.

For instance, a higher layer parameter nrofTotReportedRS_ssbri could be included/incorporated in the higher layer parameter groupBasedSsbriCriBeamReporting in CSI-ReportConfig. Here, nrofTotReportedRS_ssbri indicates the total number (N_ssbri) of measured SSB resources/beams for the first stage of beam acquisition to be reported per reporting setting, where N_ssbri shall be less than or equal to Nmax_ssbri.

Nmax_ssbri represents the maximum total number of SSB resources/beams to measure, and is higher layer configured to the UE depending on UE capability. When the field nrofTotReportedRS_ssbri is absent, the UE shall apply the value 0. With the higher layer parameter nrofTotReportedRS_ssbri, the UE shall use differential RSRP reporting for the mixed SSBRI/CRI reporting if the higher layer parameter nrofTotReportedRS_ssbri is configured to be greater than or equal to th_Nssbri.

In yet another example I.3, the UE shall use the differential RSRP reporting for the mixed SSBRI/CRI reporting if the total number of network configured CSI-RS resources/beams to measure (i.e., N_cri) is greater than or equal to a threshold, denoted by th_Ncri.

The threshold th_Ncri could be a fixed value in the specifications, e.g., 1. Alternatively, the UE could be indicated by the network the threshold th_Ncri; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_Ncri. For another example, the UE could be first higher layer RRC configured by the network a list of candidate values for the threshold th_Ncri. The UE could then receive from the network a MAC CE activation command/bitmap to activate one value from the list of candidate values for th_Ncri as the threshold th_Ncri.

For instance, a higher layer parameter nrofTotReportedRS_cri could be included/incorporated in the higher layer parameter groupBasedSsbriCriBeamReporting in CSI-ReportConfig. Here, nrofTotReportedRS_cri indicates the total number (N_cri) of measured CSI-RS resources/beams for the second stage of beam acquisition to be reported per reporting setting, where N_cri shall be less than or equal to Nmax_cri.

Nmax_cri represents the maximum total number of CSI-RS resources/beams to measure, and is higher layer configured to the UE depending on UE capability. When the field nrofTotReportedRS_cri is absent, the UE shall apply the value 0. With the higher layer parameter nrofTotReportedRS_cri, the UE shall use differential RSRP reporting for the mixed SSBRI/CRI reporting if the higher layer parameter nrofTotReportedRS_cri is configured to be greater than or equal to th_Ncri.

In yet another example I.4, the UE shall use the differential RSRP reporting for the mixed SSBRI/CRI reporting if the total number of SSBRI and CRI resources/beams to measure (i.e., N_tot) is greater than or equal to a threshold, denoted by th_Ntot.

The threshold th_Ntot could be a fixed value in the specifications, e.g., 2. Alternatively, the UE could be indicated by the network the threshold th_Ntot; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_Ntot. For another example, the UE could be first higher layer RRC configured by the network a list of candidate values for the threshold th_Ntot. The UE could then receive from the network a MAC CE activation command/bitmap to activate one value from the list of candidate values for th_Ntot as the threshold th_Ntot.

For instance, a higher layer parameter nrofTotReportedRS_tot could be included/incorporated in the higher layer parameter groupBasedSsbriCriBeamReporting in CSI-ReportConfig. Here, nrofTotReportedRS_tot indicates the total number (N_tot) of measured SSB and CSI-RS resources/beams for the two-stage beam acquisition to be reported per reporting setting, where N_tot shall be less than or equal to Nmax_tot.

Nmax_tot represents the maximum total number of SSB and CSI-RS resources/beams to measure, and is higher layer configured to the UE depending on UE capability. When the field nrofTotReportedRS_tot is absent, the UE shall apply the value 0. With the higher layer parameter nrofTotReportedRS_tot, the UE shall use differential RSRP reporting for the mixed SSBRI/CRI reporting if the higher layer parameter nrofTotReportedRS_tot is configured to be greater than or equal to th_Ntot.

In another option (Option-II), the UE could autonomously determine whether to use the differential RSRP reporting for the mixed SSBRI/CRI reporting. The UE shall indicate the network if the UE determines to use the differential RSRP reporting for the mixed SSBRI/CRI reporting (e.g., a one-bit flag).

The UE could report to the network the indication in part of the beam/CSI report or multiplexed with HARQ-ACK or multiplexed with scheduling request (SR) or via higher layer signaling such as MAC CE. Optionally, the UE could use an indicator (e.g., a two-bit indicator) to indicate whether the differential RSRP reporting for the mixed SSBRI/CRI reporting shall be applied jointly to both the SS-RSRP(s) and CSI-RSRP(s), only the SS-RSRP(s), only the CSI-RSRP(s), or separately to the SS-RSRP(s) and CSI-RSRP(s). For instance, the UE could send to the network a one-bit indicator with '1'—applied jointly to both the SS-RSRP(s) and CSI-RSRP(s) and '0'—applied to only the CSI-RSRP(s).

In one example II.1, the UE shall use the differential RSRP reporting for the mixed SSBRI/CRI reporting if the total number of SSB resources/beams to measure (i.e., N_ssbri) is greater than or equal to a threshold, denoted by th_Nssbri, wherein N_ssbri could be determined by the UE and indicated to the network. The configuration/indication of the threshold th_Nssbri could follow those specified in the example I.2.

In another example II.2, the UE shall use the differential RSRP reporting for the mixed SSBRI/CRI reporting if the total number of CSI-RS resources/beams to measure (i.e., N_cri) is greater than or equal to a threshold, denoted by th_Ncri, wherein N_cri could be determined by the UE and indicated to the network. The configuration/indication of the threshold th_Ncri could follow those specified in the example 1.3.

In yet another example II.3, the UE shall use the differential RSRP reporting for the mixed SSBRI/CRI reporting if the total number of SSB and CSI-RS resources/beams to measure (i.e., N_tot) is greater than or equal to a threshold, denoted by th_Ntot, wherein N_tot could be determined by the UE and indicated to the network. The configuration/indication of the threshold th_Ntot could follow those specified in the example 1.4.

In yet another example II.4, the UE shall use the differential RSRP reporting for the mixed SSBRI/CRI reporting if the difference between first measured RSRP value and second measured RSRP value is greater than or equal to a threshold, denoted by th_rsrp.

The threshold th_rsrp could be a fixed value in the specifications. Alternatively, the UE could be indicated by the network the threshold th_rsrp; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_rsrp. For another example, the UE could be first higher layer RRC configured by the network a list of candidate values for the threshold th_rsrp. The UE could then receive from the network a MAC CE activation command/bitmap to activate one value from the list of candidate values for th_rsrp as the threshold th_rsrp.

For example, the first measured RSRP value could correspond to the largest measured RSRP value in the given reporting instance/CSI-Report, while the second measured RSRP value could correspond to the smallest measured RSRP value in the same reporting instance/CSI-Report.

For another example, the first measured RSRP value could correspond to the largest measured RSRP value in the given reporting instance/CSI-Report, while the second measured RSRP value could correspond to the second largest measured RSRP value in the same reporting instance/CSI-Report.

Yet for another example, the first measured RSRP value could correspond to the largest measured SS-RSRP value among all the measured SS-RSRP values in the given reporting instance/CSI-Report, while the second measured RSRP value could correspond to the smallest measured CSI-RSRP value among all the measured CSI-RSRP values in the same reporting instance/CSI-Report.

Yet for another example, the first measured RSRP value could correspond to the largest measured SS-RSRP value among all the measured SS-RSRP values in the given reporting instance/CSI-Report, while the second measured RSRP value could correspond to the largest measured CSI-RSRP value among all the measured CSI-RSRP values in the same reporting instance/CSI-Report.

If the UE uses the differential RSRP reporting for the mixed SSBRI/CRI reporting given an ordering of the SSBRI(s) and CRI(s) (and therefore, the corresponding beam metrics) in the same reporting instance/CSI-Report (based on either Scheme-0 or Scheme-1), there could be various cases to calculate the RSRP values, which are presented as follows.

In one case (Case 1), the differential L1-RSRP reporting for the mixed SSBRI/CRI reporting applies jointly to both the SS-RSRP(s) and CSI-RSRP(s).

The largest measured L1-RSRP value in the given reporting instance/CSI-Report is quantized to a 7-bit value in the range [−140, −44] dBm with 1 dB step size. The other measured L1-RSRP value(s)—not the largest measured L1-RSRP value—in the same reporting instance/CSI-Report is quantized to a X_0-bit value with Y_0 dB step size with a reference to the largest measured L1-RSRP value in the same reporting instance/CSI-Report.

The value(s) of X_0 or Y_0 could be fixed in the specifications, e.g., X_0=4 and Y_0=2. Alternatively, the UE could be indicated by the network the value(s) of X_0 or Y_0; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of X_0 or Y_0. For another example, the UE could be first higher layer RRC configured by the network a list of candidate values for X_0 or Y_0. The UE could then receive from the network a MAC CE activation command/bitmap to activate one value from the list of candidate values for X_0 or Y_0 as the value(s) of X_0 or Y_0.

In another case (Case 2), the differential L1-RSRP reporting for the mixed SSBRI/CRI reporting applies only to the SS-RSRP(s).

The largest measured SS-RSRP value among all the measured SS-RSRP values in the given reporting instance/CSI—The other measured SS-RSRP value(s)—not the largest measured SS-RSRP value—in the same reporting instance/CSI-Report is quantized to a X_1-bit value with Y_1 dB step size with a reference to the largest measured SS-RSRP value in the same reporting instance/CSI-Report is quantized to a 7-bit value in the range [440, −44] dBm with 1 dB step size.

The measured CSI-RSRP value(s) in the same reporting instance/CSI-Report is quantized to a 7-bit value in the range [−140, −44] dBm with 1 dB step size.

The value(s) of X_1 or Y_1 could be fixed in the specifications, e.g., X_1=4 and Y_1=2. Alternatively, the UE could be indicated by the network the value(s) of X_1 or Y_1; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of X_1 or Y_1. For another example, the UE could be first higher layer RRC configured by the network a list of candidate values for X_1 or Y_1. The UE could then receive from the network a MAC CE activation command/bitmap to activate one value from the list of candidate values for X_1 or Y_1 as the value(s) of X_1 or Y_1.

In yet another case (Case 3), the differential L1-RSRP reporting for the mixed SSBRI/CRI reporting applies only to the CSI-RSRP(s).

The largest measured CSI-RSRP value among all the measured CSI-RSRP values in the given reporting instance/CSI-Report is quantized to a 7-bit value in the range [−140, −44] dBm with 1 dB step size. The other measured CSI-RSRP value(s)—not the largest measured CSI-RSRP value—in the same reporting instance/CSI-Report is quantized to a X_2-bit value with Y_2 dB step size with a reference to the largest measured CSI-RSRP value in the same reporting instance/CSI-Report.

The measured SS-RSRP value(s) in the same reporting instance/CSI-Report is quantized to a 7-bit value in the range [−140, −44] dBm with 1 dB step size.

The value(s) of $X\_2$ or $Y\_2$ could be fixed in the specifications, e.g., $X\_2=4$ and $Y\_2=2$. Alternatively, the UE could be indicated by the network the value(s) of $X\_2$ or $Y\_2$; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value(s) of $X\_2$ or $Y\_2$. For another example, the UE could be first higher layer RRC configured by the network a list of candidate values for $X\_2$ or $Y\_2$. The UE could then receive from the network a MAC CE activation command/bitmap to activate one value from the list of candidate values for $X\_2$ or $Y\_2$ as the value(s) of $X\_2$ or $Y\_2$.

In yet another case (Case 4), the differential L1-RSRP reporting for the mixed SSBRI/CRI reporting applies separately to the SS-RSRP(s) and CSI-RSRP(s).

The largest measured SS-RSRP value among all the measured SS-RSRP values in the given reporting instance/CSI-Report is quantized to a 7-bit value in the range [440, −44] dBm with 1 dB step size. The other measured SS-RSRP value(s)—not the largest measured SS-RSRP value in the same reporting instance/CSI-Report is quantized to a $X\_1$-bit value with $Y\_1$ dB step size with a reference to the largest measured SS-RSRP value in the same reporting instance/CSI-Report. The configuration/indication of the value(s) of $X\_1$ or $Y\_1$ could follow those specified in Case 2.

The largest measured CSI-RSRP value among all the measured CSI-RSRP values in the given reporting instance/CSI-Report is quantized to a 7-bit value in the range [−140, −44] dBm with 1 dB step size. The other measured CSI-RSRP value(s)—not the largest measured CSI-RSRP value—in the same reporting instance/CSI-Report is quantized to a $X\_2$-bit value with $Y\_2$ dB step size with a reference to the largest measured CSI-RSRP value in the same reporting instance/CSI-Report. The configuration/indication of value(s) of $X\_2$ and $Y\_2$ could follow those specified in Case 3.

If the UE uses the differential RSRP reporting for the mixed SSBRI/CRI reporting given an ordering of the SSBRI(s) and CRI(s) (and therefore, the corresponding beam metrics) in the reporting instance/CSI-Report (based on either Scheme-0 or Scheme-1), the UE could indicate the network information related to the largest measured L1-RSRP value in part of the beam/CSI report or multiplexed with HARQ-ACK or multiplexed with scheduling request (SR) or via higher layer signaling such as MAC CE.

For Case 1, the information could include at least one of the following.

The 7-bit quantized value of the largest measured L1-RSRP among all the reported beam metrics in the same reporting instance/CSI-Report.

The position/ordering of the largest measured L1-RSRP value among all the reported beam metrics in the given reporting instance/CSI-Report.

For instance, for a given ordering of the resource indicators (SSBRI(s) and CRI(s))/beam metrics in the reporting instance, if the largest measured L1-RSRP value is the $2^{nd}$ reported beam metric among all five reported beam metrics, the UE could send to the network a bitmap [0 1 0 0 0] to indicate the position/ordering of the largest measured L1-RSRP value in the reporting instance/CSI-Report.

The position/ordering of the resource indicator (SSBRI or CRI) associated with the largest measured L1-RSRP value among all the reported resource indicators in the given reporting in stance/C S I-Report.

For instance, for a given ordering of the resource indicators (SSBRI(s) and CRI(s))/beam metrics in the reporting instance, if the SSBRI or CRI associated with the largest measured L1-RSRP value is the $2^{nd}$ reported resource indicator among all five reported resource indicators, the UE could send to the network a bitmap [0 1 0 0 0] to indicate the position/ordering of the resource indicator (SSBRI or CRI) associated with the largest measured L1-RSRP value in the reporting instance/CSI-Report.

For Case 2, the information could include at least one of the following.

The 7-bit quantized value of the largest measured SS-RSRP value among all the measured SS-RSRP values in the given reporting instance/CSI-Report.

The position/ordering of the largest measured SS-RSRP value among all the measured SS-RSRP values in the given reporting instance/CSI-Report.

For instance, for a given ordering of the resource indicators (SSBRI(s) and CRI(s))/beam metrics in the reporting instance, if the largest measured SS-RSRP value among all the measured SS-RSRP values is the $2^{nd}$ reported beam metric among all five reported beam metrics, the UE could send to the network a bitmap [0 1 0 0 0] to indicate the position/ordering of the largest measured SS-RSRP value among all the measured SS-RSRP values in the reporting instance/CSI-Report.

The position/ordering of the SSBRI associated with the largest measured SS-RSRP value among all the measured SS-RSRP values in the given reporting instance/CSI-Report.

For instance, for a given ordering of the resource indicators (SSBRI(s) and CRI(s))/beam metrics in the reporting instance, if the SSBRI associated with the largest measured SS-RSRP value among all the measured SS-RSRP values is the $2^{nd}$ reported resource indicator among all five reported resource indicators, the UE could send to the network a bitmap [0 1 0 0 0] to indicate the position/ordering of the SSBRI associated with the largest measured SS-RSRP value among all the measured SS-RSRP values in the reporting instance/CSI-Report.

For Case 3, the information could include at least one of the following.

The 7-bit quantized value of the largest measured CSI-RSRP value among all the measured CSI-RSRP values in the given reporting instance/CSI-Report.

The position/ordering of the largest measured CSI-RSRP value among all the measured CSI-RSRP values in the given reporting instance/CSI-Report.

For instance, for a given ordering of the resource indicators (SSBRI(s) and CRI(s))/beam metrics in the reporting instance, if the largest measured CSI-RSRP value among all the measured CSI-RSRP values is the $2^{nd}$ reported beam metric among all five reported beam metrics, the UE could send to the network a bitmap [0 1 0 0 0] to indicate the position/ordering of the largest measured CSI-RSRP value among all the measured CSI-RSRP values in the reporting instance/CSI-Report.

The position/ordering of the CRI associated with the largest measured CSI-RSRP value among all the measured CSI-RSRP values in the given reporting instance/CSI-Report.

For instance, for a given ordering of the resource indicators (SSBRI(s) and CRI(s))/beam metrics in the reporting instance, if the CRI associated with the largest measured CSI-RSRP value among all the measured CSI-RSRP values is the $2^{nd}$ reported resource indicator among all five reported resource indicators, the UE could send to the network a bitmap [0 1 0 0 0] to indicate the position/ordering of the CRI associated with the largest measured CSI-RSRP value among all the measured CSI-RSRP values in the reporting instance/CSI-Report.

For Case 4, the information could include at least one of the following.

The 7-bit quantized value of the largest measured SS-RSRP value among all the measured SS-RSRP values in the given reporting instance/CSI-Report, and the 7-bit quantized value of the largest measured CSI-RSRP value among all the measured CSI-RSRP values in the given reporting instance/CSI-Report.

The position/ordering of the largest measured SS-RSRP value among all the measured SS-RSRP values in the given reporting instance/CSI-Report, and the position/ordering of the largest measured CSI-RSRP value among all the measured CSI-RSRP values in the given reporting instance/CSI-Report.

For instance, for a given ordering of the resource indicators (SSBRI(s) and CRI(s))/beam metrics in the reporting instance, if the largest measured SS-RSRP value among all the measured SS-RSRP values is the $2^{nd}$ reported beam metric among all five reported beam metrics, and the largest measured CSI-RSRP value among all the measured CSI-RSRP values is the $4^{th}$ reported beam metric among all five reported beam metrics, the UE could send to the network a bitmap [0 1 0 1 0] to indicate the position/ordering of the largest measured SS-RSRP value among all the measured SS-RSRP values in the reporting instance/CSI-Report, and the position/ordering of the largest measured CSI-RSRP value among all the measured CSI-RSRP values in the reporting instance/CSI-Report.

Alternatively, the UE could send to the network two bitmaps separately indicating the position/ordering of the largest measured SS-RSRP value among all the measured SS-RSRP values in the reporting instance/CSI-Report and the position/ordering of the largest measured CSI-RSRP value among all the measured CSI-RSRP values in the reporting instance/CSI-Report.

The position/ordering of the SSBRI—among all the reported resource indicators—associated with the largest measured SS-RSRP value among all the measured SS-RSRP values in the given reporting instance/CSI-Report, and the position/ordering of the CRI—among all the reported resource indicators—associated with the largest measured CSI-RSRP value among all the measured CSI-RSRP values in the given reporting instance/CSI-Report.

For instance, for a given ordering of the resource indicators (SSBRI(s) and CRI(s))/beam metrics in the reporting instance, if the SSBRI associated with the largest measured SS-RSRP value among all the measured SS-RSRP values is the $2^{nd}$ reported resource indicator among all five reported resource indicators, and the CRI associated with the largest measured CSI-RSRP value among all the measured CSI-RSRP values is the $4^{th}$ reported resource indicator among all five reported resource indicators, the UE could send to the network a bitmap [0 1 0 1 0] to indicate the position/ordering of the SSBRI—among all the reported resource indicators—associated with the largest measured SS-RSRP value among all the measured SS-RSRP values in the reporting instance/CSI-Report, and the position/ordering of the CRI—among all the reported resource indicators—associated with the largest measured CSI-RSRP value among all the measured CSI-RSRP values in the reporting instance/CSI-Report.

Alternatively, the UE could send to the network two bitmaps separately indicating the position/ordering of the SSBRI—among all the reported resource indicators—associated with the largest measured SS-RSRP value among all the measured SS-RSRP values in the reporting instance/CSI-Report and the position/ordering of the CRI—among all the reported resource indicators—associated with the largest measured CSI-RSRP value among all the measured CSI-RSRP values in the reporting instance/CSI-Report.

In yet another scheme (Scheme-2), if the differential RSRP reporting is enabled, the network or the UE could first determine the position(s)/ordering (or the reference position(s)/ordering) in the CSI reporting instance/CSI-Report for sending one or more reference RSRP values (e.g., the largest measured L1-RSRP values). Alternatively, if differential RSRP reporting is enabled, the (reference) position in the reporting instance/CSI-Report can be fixed, e.g. to the $1^{st}$ beam report or Pt position in the reporting instance/CSI-Report. Various methods of configuring/indicating the (reference) position(s)/ordering in the CSI reporting instance/CSI-Report are presented as follows.

In one method (Method-2.1), the UE could be indicated by the network the (reference) position(s)/ordering in the given CSI reporting instance/CSI-Report for sending one or more reference RSRP values; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

If the differential L1-RSRP reporting for the mixed SSBRI/CRI reporting applies jointly to both the SS-RSRP(s) and CSI-RSRP(s), the UE could be indicated by the network the (reference) position/ordering in the given reporting instance/CSI-Report for sending the largest measured L1-RSRP value among all the measured beam metrics.

For instance, the UE could receive from the network a bitmap. In the bitmap, the bit position configured as '1' indicates the position in the reporting instance/CSI-Report to send the largest measured L1-RSRP value among all the measured beam metrics or send the corresponding resource indicator.

If the differential L1-RSRP reporting for the mixed SSBRI/CRI reporting applies only to the SS-RSRP(s), the UE could be indicated by the network the (reference) position/ordering in the given reporting instance/CSI-Report for sending the largest measured SS-RSRP value among all the measured SS-RSRP values.

For instance, the UE could receive from the network a bitmap. In the bitmap, the bit position configured as '1' indicates the position in the reporting instance/CSI-Report to send the largest measured SS-RSRP value among all the measured SS-RSRP values or send the corresponding SSBRI.

If the differential L1-RSRP reporting for the mixed SSBRI/CRI reporting applies only to the CSI-RSRP(s), the UE could be indicated by the network the (reference) position/ordering in the given reporting instance/CSI-Report for sending the largest measured CSI-RSRP value among all the measured CSI-RSRP values.

For instance, the UE could receive from the network a bitmap. In the bitmap, the bit position configured as '1' indicates the position in the reporting instance/CSI-Report to send the largest measured CSI-RSRP value among all the measured CSI-RSRP values or send the corresponding CRI.

If the differential L1-RSRP reporting for the mixed SSBRI/CRI reporting applies separately to the SS-RSRP(s)

and CSI-RSRP(s), the UE could be indicated by the network the (reference) position/ordering in the given reporting instance/CSI-Report for sending the largest measured SS-RSRP value among all the measured SS-RSRP values, and the (reference) position/ordering in the same reporting instance/CSI-Report for sending the largest measured CSI-RSRP value among all the measured CSI-RSRP values.

For instance, the UE could receive from the network a bitmap. In the bitmap, a first bit position configured as '1' indicates the position in the reporting instance/CSI-Report to send the largest measured SS-RSRP value among all the measured SS-RSRP values or send the corresponding SSBRI, and a second bit position configured as '1' indicates the position in the reporting instance/CSI-Report to send the largest measured CSI-RSRP value among all the measured CSI-RSRP values or send the corresponding CRI.

Alternatively, the UE could receive from the network two bitmaps. In the first bitmap, the bit position configured as '1' indicates the position in the reporting instance/CSI-Report to send the largest measured SS-RSRP value among all the measured SS-RSRP values or send the corresponding SSBRI. In the second bitmap, the bit position configured as '1' indicates the position in the reporting instance/CSI-Report to send the largest measured CSI-RSRP value among all the measured CSI-RSRP values or send the corresponding CRI.

Whether a bit position configured as '1' is the first bit position or the second bit position could be: (1) configured/indicated by the network or (2) determined by the UE and indicated to the network.

In another method (Method-2.2), the UE could autonomously determine and indicate the network the (reference) position(s)/ordering in the given CSI reporting instance/CSI-Report for sending the one or more reference RSRP values; the UE could send to the network the indication in part of the beam/CSI report or multiplexed with HARQ-ACK or multiplexed with scheduling request (SR) or via higher layer signaling such as MAC CE.

If the differential L1-RSRP reporting for the mixed SSBRI/CRI reporting applies jointly to both the SS-RSRP(s) and CSI-RSRP(s), the UE could send to the network the (reference) position/ordering in the given reporting instance/CSI-Report for sending the largest measured L1-RSRP value among all the measured beam metrics.

For instance, the UE could send to the network a bitmap. In the bitmap, the bit position configured as '1' indicates the position in the reporting instance/CSI-Report to send the largest measured L1-RSRP value among all the measured beam metrics or send the corresponding resource indicator.

If the differential L1-RSRP reporting for the mixed SSBRI/CRI reporting applies only to the SS-RSRP(s), the UE could indicate the network the (reference) position/ordering in the given reporting instance/CSI-Report for sending the largest measured SS-RSRP value among all the measured SS-RSRP values.

For instance, the UE could send to the network a bitmap. In the bitmap, the bit position configured as '1' indicates the position in the reporting instance/CSI-Report to send the largest measured SS-RSRP value among all the measured SS-RSRP values or send the corresponding SSBRI.

If the differential L1-RSRP reporting for the mixed SSBRI/CRI reporting applies only to the CSI-RSRP(s), the UE could indicate the network the (reference) position/ordering in the given reporting instance/CSI-Report for sending the largest measured CSI-RSRP value among all the measured CSI-RSRP values.

For instance, the UE could send to the network a bitmap. In the bitmap, the bit position configured as '1' indicates the position in the reporting instance/CSI-Report to send the largest measured CSI-RSRP value among all the measured CSI-RSRP values or send the corresponding CRI.

If the differential L1-RSRP reporting for the mixed SSBRI/CRI reporting applies separately to the SS-RSRP(s) and CSI-RSRP(s), the UE could indicate the network the (reference) position/ordering in the given reporting instance/CSI-Report for sending the largest measured SS-RSRP value among all the measured SS-RSRP values, and the (reference) position/ordering in the same reporting instance/CSI-Report for sending the largest measured CSI-RSRP value among all the measured CSI-RSRP values.

For instance, the UE could send to the network a bitmap. In the bitmap, a first bit position configured as '1' indicates the position in the reporting instance/CSI-Report to send the largest measured SS-RSRP value among all the measured SS-RSRP values or send the corresponding SSBRI, and a second bit position configured as '1' indicates the position in the reporting instance/CSI-Report to send the largest measured CSI-RSRP value among all the measured CSI-RSRP values or send the corresponding CRI.

Alternatively, the UE could send to the network two bitmaps. In the first bitmap, the bit position configured as '1' indicates the position in the reporting instance/CSI-Report to send the largest measured SS-RSRP value among all the measured SS-RSRP values or send the corresponding SSBRI. In the second bitmap, the bit position configured as '1' indicates the position in the reporting instance/CSI-Report to send the largest measured CSI-RSRP value among all the measured CSI-RSRP values or send the corresponding CRI.

Whether a bit position configured as '1' is the first bit position or the second bit position could be: (1) configured/indicated by the network or (2) determined by the UE and indicated to the network.

The ordering of the SSBRI(s) and CRI(s) (and therefore, the corresponding beam metrics) for the rest of the position(s) other than the (reference) position(s) for sending the reference RSRP(s) in the same CSI reporting instance/CSI-Report could follow those specified in Method-1.1, Method-1.2 or Method-1.3 in the present disclosure.

Furthermore, the differential RSRP reporting for the mixed SSBRI/CRI reporting could be enabled/configured following the conditions specified in Option-I or Option-II in the present disclosure. The detailed differential L1-RSRP calculations could follow those specified in Case 1, Case 2, Case 3, or Case 4 in the present disclosure. Additionally, using Scheme-0, Scheme-1 and/or Scheme-2 could be: (1) configured/indicated by the network and/or (2) determined by the UE and indicated to the network.

The UE could report in a single CSI reporting instance/CSI-Report, N_ssbri≥1 SSBRIs (and therefore, their corresponding N_ssbri beam metrics such as L1-RSRPs) and N_cri≥1 CRIs (and therefore, their corresponding N_cri beam metrics such as L1-RSRPs) in two parts, i.e., two-part beam report/UCI.

The UE could determine the N_ssbri≥1 SSBRIs (and therefore, their corresponding N_ssbri beam metrics such as L1-RSRPs) based on the measurements of the SSB resources/beams configured at the first stage of beam acquisition, and the UE could determine the N_cri≥1 CRIs (and therefore, their corresponding N_cri beam metrics such as L1-RSRPs) based on the measurements of the CSI-RS resources/beams configured at the second stage of beam acquisition.

Part 1 of the beam report/UCI could have a fixed payload size (in terms of the number of bits) and could be used to identify/indicate the size of the payload in part 2 of the beam report/UCI. Part 1 of the beam report/UCI shall be transmitted in its entirety before the transmission of part 2 of the beam report/UCI.

In one example, part 2 of the beam report/UCI can be absent. When absent, the beam report is via part 1 only (i.e. one part UCI), and when present, the beam report is via both part 1 and part 2 (i.e. two-part UCI). In one example, part 2 of the beam report/UCI is always present, but its payload could vary depending on the information in part 1.

The value(s) of N_ssbri or N_cri could be configured/indicated by the network, or the UE, or both of the network and the UE, following the design examples specified in Method-1, Method-2 or Method-3 in the present disclosure.

Various schemes to construct the two-part beam report/UCI for sending both the SSBRI(s) and CRI(s) are presented as follows.

In one scheme (Scheme-A), part 1 of the beam report could contain/comprise N_ssbri SSBRIs and the corresponding N_ssbri beam metrics; part 1 of the beam report could also indicate the number (N_cri) of CRIs reported in part 2 of the beam report. Part 2 of the beam report could contain/comprise N_cri CRIs and the corresponding N_cri beam metrics.

In another scheme (Scheme-B), part 1 of the beam report could contain/comprise N_cri CRIs and the corresponding N_cri beam metrics; part 1 of the beam report could also indicate the number (N_ssbri) of SSBRIs reported in part 2 of the beam report. Part 2 of the beam report could contain/comprise N_ssbri SSBRIs and the corresponding N_ssbri beam metrics.

In yet another scheme (Scheme-C), part 1 of the beam report could contain/comprise a subset (M_ssbri) of N_ssbri SSBRIs and the corresponding M_ssbri beam metrics (M_ssbri<N_ssbri); part 1 of the beam report could also indicate the number (K_ssbri) of remaining SSBRIs reported in part 2 of the beam report (K_ssbri=N_ssbri-M_ssbri) and the number (N_cri) of CRIs reported in part 2 of the beam report. Part 2 of the beam report could contain/comprise K_ssbri SSBRIs and the corresponding K_ssbri beam metrics, and N_cri CRIs and the corresponding N_cri beam metrics. The ordering of the SSBRI(s) and CRI(s) in part 2 of the beam report could follow those specified in Scheme-0, Scheme-1 or Scheme-2 in the present disclosure.

In yet another scheme (Scheme-D), part 1 of the beam report could contain/comprise a subset (M_cri) of N_cri CRIs and the corresponding M_cri beam metrics (M_cri<N_cri); part 1 of the beam report could also indicate the number (K_cri) of remaining CRIs reported in part 2 of the beam report (K_cri=N_cri-M_cri) and the number (N_ssbri) of SSBRIs reported in part 2 of the beam report. Part 2 of the beam report could contain/comprise K_cri CRIs and the corresponding K_cri beam metrics, and N_ssbri SSBRIs and the corresponding N_ssbri beam metrics. The ordering of the SSBRI(s) and CRI(s) in part 2 of the beam report could follow those specified in Scheme-0, Scheme-1 or Scheme-2 in the present disclosure.

In yet another scheme (Scheme-E), part 1 of the beam report could contain/comprise a subset (M_ssbri) of N_ssbri SSBRIs and the corresponding M_ssbri beam metrics (M_ssbri<N_ssbri), and a subset (M_cri) of N_cri CRIs and the corresponding M_cri beam metrics; part 1 of the beam report could also indicate the number (K_ssbri) of remaining SSBRIs reported in part 2 of the beam report (K_ssbri=N_ssbri-M_ssbri) and the number (K_cri) of remaining CRIs reported in part 2 of the beam report (K_cri=N_cri-M_cri).

Part 2 of the beam report could contain/comprise K_ssbri SSBRIs and the corresponding K_ssbri beam metrics, and K_cri CRIs and the corresponding K_cri beam metrics. The ordering of the SSBRI(s) and CRI(s) in both part 1 and part 2 of the beam report could follow those specified in Scheme-0, Scheme-1 or Scheme-2 in the present disclosure.

In a first variation of Scheme-A through Scheme-E, the mixed SSBRI/CRI reporting is via a one-part UCI or a two-part UCI depending on a condition.

In one example, the condition is based on the number (N_ssbri) of SSBRIs. For example, when N_ssbri<=x (where x is threshold, fixed or configured), the one-part UCI is used for the reporting, and when N_ssbri>x, the two-part UCI is used for the reporting.

In another example, the condition is based on the number (N_cri) of CRIs. For example, when N_cri<=y (where y is threshold, fixed or configured), the one-part UCI is used for the reporting, and when N_cri>y, the two-part UCI is used for the reporting.

In yet another example, the condition is based on the total number (N_tot=N_ssbri+N_cri) of SSBRI(s) and CRI(s) reported in the same reporting instance. For example, when N_tot<=z (where z is threshold, fixed or configured), the one-part UCI is used for the reporting, and when N_tot>z, the two-part UCI is used for the reporting.

In a second variation of Scheme-A through Scheme-E, the mixed SSBRI/CRI reporting is via one-part UCI or a two-part UCI depending on a signaling from the network. This signaling could be semi-static via higher layer RRC signaling (using a dedicated parameter or with a joint configuration parameter) or more dynamic via MAC CE or DCI based signaling (using a dedicated indication or with a joint indication).

Furthermore, in one example, the mixed SSBRI/CRI reporting could be multiplexed with other types of CSI or beam reports, wherein whether one-part or two-part UCI is used for beam reporting could depend on the other CSI or beam reports.

For example, the two-part UCI is used only when at least one of the other CSI or beam reports is configured with a two-part UCI. In another example, the UL channel for the mixed SSBRI/CRI reporting (via two-part UCI) can be fixed, e.g. to PUSCH. In yet another example, the UL channel for the mixed SSBRI/CRI reporting (via two-part UCI) can be fixed, e.g. to PUCCH. In yet another example, the UL channel for the mixed SSBRI/CRI reporting (via two-part UCI) can be configured from PUCCH and PUSCH. In yet another example, the mixed SSBRI/CRI reporting (via two-part UCI) can be configured via higher layer RRC signaling. In yet another example, the mixed SSBRI/CRI reporting (via two-part UCI) can only be triggered via a code point in DCI (UL-related or DL-related DCI).

The differential RSRP reporting for the mixed SSBRI/CRI reporting in two-part beam report/UCI could be enabled/configured following the conditions specified in Option-I or Option-II in the present disclosure. The detailed differential L1-RSRP calculations could follow those specified in Case 1, Case 2, Case 3, or Case 4 in the present disclosure.

If the UE uses the differential RSRP reporting for the mixed SSBRI/CRI reporting in two-part beam report/UCI (based on Scheme-A, Scheme-B, Scheme-C, Scheme-D or Scheme-E), the UE could indicate the network information related to the largest measured L1-RSRP value in part of the beam/CSI report or multiplexed with HARQ-ACK or multiplexed with scheduling request (SR) or via higher layer signaling such as MAC CE.

For Case 1, the information could include at least one of the following.

The 7-bit quantized value of the largest measured L1-RSRP among all the reported beam metrics in the same reporting instance/CSI-Report, which could be indicated/included in part 1 or part 2 of the beam report/UCI.

The position/ordering of the largest measured L1-RSRP value among all the reported beam metrics in the given reporting instance/CSI-Report (or equivalently, the position/ordering of the resource indicator (SSBRI or CRI) associated with the largest measured L1-RSRP value among all the reported resource indicators in the given reporting instance/CSI-Report.

For Scheme-A, if the largest measured L1-RSRP value corresponds to a beam metric associated with a SSBRI in part 1 of the beam report/UCI, a bitmap of length N_ssbri with the bit position '1' indicating the position of the largest measured L1-RSRP among the N_ssbri beam metrics reported in part 1 could be indicated/included in part 1 of the beam report/UCI.

If the largest measured L1-RSRP value corresponds to a beam metric associated with a CRI in part 2 of the beam report/UCI, a bitmap of length N_cri with the bit position '1' indicating the position of the largest measured L1-RSRP among the N_cri beam metrics reported in part 2 could be indicated/included in part 2 of the beam report/UCI. Alternatively, a bitmap of length N_tot with the bit position '1' indicating the position of the largest measured L1-RSRP among all the N_tot beam metrics could be indicated/included in either part 1 or part 2 of the beam report/UCI.

For Scheme-B, if the largest measured L1-RSRP value corresponds to a beam metric associated with a CRI in part 1 of the beam report/UCI, a bitmap of length N_cri with the bit position '1' indicating the position of the largest measured L1-RSRP among the N_cri beam metrics reported in part 1 could be indicated/included in part 1 of the beam report/UCI.

If the largest measured L1-RSRP value corresponds to a beam metric associated with a SSBRI in part 2 of the beam report/UCI, a bitmap of length N_ssbri with the bit position '1' indicating the position of the largest measured L1-RSRP among the N_ssbri beam metrics reported in part 2 could be indicated/included in part 2 of the beam report/UCI. Alternatively, a bitmap of length N_tot with the bit position '1' indicating the position of the largest measured L1-RSRP among all the N_tot beam metrics could be indicated/included in either part 1 or part 2 of the beam report/UCI.

For Scheme-C, if the largest measured L1-RSRP value corresponds to a beam metric associated with a SSBRI in part 1 of the beam report/UCI, a bitmap of length M_ssbri with the bit position '1' indicating the position of the largest measured L1-RSRP among the M_ssbri beam metrics reported in part 1 could be indicated/included in part 1 of the beam report/UCI.

If the largest measured L1-RSRP value corresponds to a beam metric in part 2 of the beam report/UCI, a bitmap of length (K_ssbri+N_cri) with the bit position '1' indicating the position of the largest measured L1-RSRP among the (K_ssbri+N_cri) beam metrics reported in part 2 could be indicated/included in part 2 of the beam report/UCI. Alternatively, a bitmap of length N_tot with the bit position '1' indicating the position of the largest measured L1-RSRP among all the N_tot beam metrics could be indicated/included in either part 1 or part 2 of the beam report/UCI.

For Scheme-D, if the largest measured L1-RSRP value corresponds to a beam metric associated with a CRI in part 1 of the beam report/UCI, a bitmap of length M_cri with the bit position '1' indicating the position of the largest measured L1-RSRP among the M_cri beam metrics reported in part 1 could be indicated/included in part 1 of the beam report/UCI.

If the largest measured L1-RSRP value corresponds to a beam metric in part 2 of the beam report/UCI, a bitmap of length (K_cri+N_ssbri) with the bit position '1' indicating the position of the largest measured L1-RSRP among the (K_cri+N_ssbri) beam metrics reported in part 2 could be indicated/included in part 2 of the beam report/UCI. Alternatively, a bitmap of length N_tot with the bit position '1' indicating the position of the largest measured L1-RSRP among all the N_tot beam metrics could be indicated/included in either part 1 or part 2 of the beam report/UCI.

For Scheme-E, if the largest measured L1-RSRP value corresponds to a beam metric in part 1 of the beam report/UCI, a bitmap of length (M_ssbri+M_cri) with the bit position '1' indicating the position of the largest measured L1-RSRP among the (M_ssbri+M_cri) beam metrics reported in part 1 could be indicated/included in part 1 of the beam report/UCI.

If the largest measured L1-RSRP value corresponds to a beam metric in part 2 of the beam report/UCI, a bitmap of length (K_ssbri+K_cri) with the bit position '1' indicating the position of the largest measured L1-RSRP among the (K_ssbri+K_cri) beam metrics reported in part 2 could be indicated/included in part 2 of the beam report/UCI. Alternatively, a bitmap of length N_tot with the bit position '1' indicating the position of the largest measured L1-RSRP among all the N_tot beam metrics could be indicated/included in either part 1 or part 2 of the beam report/UCI.

For Case 2, the information could include at least one of the following.

The 7-bit quantized value of the largest measured SS-RSRP value among all the measured SS-RSRP values in the given reporting instance/CSI-Report, which could be indicated/included in part 1 or part 2 of the beam report/UCI.

The position/ordering of the largest measured SS-RSRP value among all the measured SS-RSRP values in the given reporting instance/CSI-Report (or equivalently, the position/ordering of the SSBRI associated with the largest measured SS-RSRP value among all the measured SS-RSRP values in the given reporting instance/CSI-Report).

For Scheme-A, a bitmap of length N_ssbri with the bit position '1' indicating the position of the largest measured SS-RSRP among the N_ssbri beam metrics reported in part 1 could be indicated/included in part 1 or part 2 of the beam report/UCI. Alternatively, a bitmap of length N_tot with the bit position '1' indicating the position of the largest measured SS-RSRP among all the N_tot beam metrics could be indicated/included in either part 1 or part 2 of the beam report/UCI.

For Scheme-B, a bitmap of length N_ssbri with the bit position '1' indicating the position of the largest measured SS-RSRP among the N_ssbri beam metrics reported in part 2 could be indicated/included in part 1 or part 2 of the beam report/UCI. Alternatively, a bitmap of length N_tot with the bit position '1' indicating the position of the largest measured SS-RSRP among all the N_tot beam metrics could be indicated/included in either part 1 or part 2 of the beam report/UCI.

For Scheme-C, if the largest measured SS-RSRP value corresponds to a beam metric associated with a SSBRI in part 1 of the beam report/UCI, a bitmap of length M_ssbri with the bit position '1' indicating the position of the largest measured SS-RSRP among the M_ssbri beam metrics reported in part 1 could be indicated/included in part 1 of the beam report/UCI.

If the largest measured SS-RSRP value corresponds to a beam metric associated with a SSBRI in part 2 of the beam report/UCI, a bitmap of length (K_ssbri+N_cri) with the bit position '1' indicating the position of the largest measured SS-RSRP among the (K_ssbri+N_cri) beam metrics reported in part 2 could be indicated/included in part 2 of the beam report/UCI. Alternatively, a bitmap of length N_tot with the bit position '1' indicating the position of the largest measured SS-RSRP among all the N_tot beam metrics could be indicated/included in either part 1 or part 2 of the beam report/UCI.

For Scheme-D, a bitmap of length (K_cri+N_ssbri) with the bit position '1' indicating the position of the largest measured SS-RSRP among the (K_cri+N_ssbri) beam metrics reported in part 2 could be indicated/included in part 2 or part 1 of the beam report/UCI. Alternatively, a bitmap of length N_tot with the bit position '1' indicating the position of the largest measured SS-RSRP among all the N_tot beam metrics could be indicated/included in either part 1 or part 2 of the beam report/UCI.

For Scheme-E, if the largest measured SS-RSRP value corresponds to a beam metric associated with a SSBRI in part 1 of the beam report/UCI, a bitmap of length (M_ssbri+M_cri) with the bit position '1' indicating the position of the largest measured SS-RSRP among the (M_ssbri+M_cri) beam metrics reported in part 1 could be indicated/included in part 1 of the beam report/UCI.

If the largest measured SS-RSRP value corresponds to a beam metric associated with a SSBRI in part 2 of the beam report/UCI, a bitmap of length (K_ssbri+K_cri) with the bit position '1' indicating the position of the largest measured SS-RSRP among the (K_ssbri+K_cri) beam metrics reported in part 2 could be indicated/included in part 2 of the beam report/UCI. Alternatively, a bitmap of length N_tot with the bit position '1' indicating the position of the largest measured SS-RSRP among all the N_tot beam metrics could be indicated/included in either part 1 or part 2 of the beam report/UCI.

For Case 3, the information could include at least one of the following.

The 7-bit quantized value of the largest measured CSI-RSRP value among all the measured CSI-RSRP values in the given reporting instance/CSI-Report, which could be indicated/included in part 1 or part 2 of the beam report/UCI.

The position/ordering of the largest measured CSI-RSRP value among all the measured CSI-RSRP values in the given reporting instance/CSI-Report (or equivalently, the position/ordering of the CRI associated with the largest measured CSI-RSRP value among all the measured CSI-RSRP values in the given reporting instance/CSI-Report).

For Scheme-A, a bitmap of length N_cri with the bit position '1' indicating the position of the largest measured CSI-RSRP among the N_cri beam metrics reported in part 2 could be indicated/included in part 1 or part 2 of the beam report/UCI. Alternatively, a bitmap of length N_tot with the bit position '1' indicating the position of the largest measured CSI-RSRP among all the N_tot beam metrics could be indicated/included in either part 1 or part 2 of the beam report/UCI.

For Scheme-B, a bitmap of length N_cri with the bit position '1' indicating the position of the largest measured CSI-RSRP among the N_cri beam metrics reported in part 1 could be indicated/included in part 1 or part 2 of the beam report/UCI. Alternatively, a bitmap of length N_tot with the bit position '1' indicating the position of the largest measured CSI-RSRP among all the N_tot beam metrics could be indicated/included in either part 1 or part 2 of the beam report/UCI.

For Scheme-C, a bitmap of length (K_ssbri+N_cri) with the bit position '1' indicating the position of the largest measured CSI-RSRP among the (K_ssbri+N_cri) beam metrics reported in part 2 could be indicated/included in part 2 or part 1 of the beam report/UCI. Alternatively, a bitmap of length N_tot with the bit position '1' indicating the position of the largest measured CSI-RSRP among all the N_tot beam metrics could be indicated/included in either part 1 or part 2 of the beam report/UCI.

For Scheme-D, if the largest measured CSI-RSRP value corresponds to a beam metric associated with a CRI in part 1 of the beam report/UCI, a bitmap of length M_cri with the bit position '1' indicating the position of the largest measured CSI-RSRP among the M_cri beam metrics reported in part 1 could be indicated/included in part 1 of the beam report/UCI.

If the largest measured CSI-RSRP value corresponds to a beam metric associated with a CRI in part 2 of the beam report/UCI, a bitmap of length (K_cri+N_ssbri) with the bit position '1' indicating the position of the largest measured CSI-RSRP among the (K_cri+N_ssbri) beam metrics reported in part 2 could be indicated/included in part 2 of the beam report/UCI. Alternatively, a bitmap of length N_tot with the bit position '1' indicating the position of the largest measured CSI-RSRP among all the N_tot beam metrics could be indicated/included in either part 1 or part 2 of the beam report/UCI.

For Scheme-E, if the largest measured CSI-RSRP value corresponds to a beam metric associated with a CRI in part 1 of the beam report/UCI, a bitmap of length (M_ssbri+M_cri) with the bit position '1' indicating the position of the largest measured CSI-RSRP among the (M_ssbri+M_cri) beam metrics reported in part 1 could be indicated/included in part 1 of the beam report/UCI.

If the largest measured CSI-RSRP value corresponds to a beam metric associated with a CRI in part 2 of the beam report/UCI, a bitmap of length (K_ssbri+K_cri) with the bit position '1' indicating the position of the largest measured CSI-RSRP among the (K_ssbri+K_cri) beam metrics reported in part 2 could be indicated/included in part 2 of the beam report/UCI. Alternatively, a bitmap of length N_tot with the bit position '1' indicating the position of the largest measured CSI-RSRP among all the N_tot beam metrics could be indicated/included in either part 1 or part 2 of the beam report/UCI.

For Case 4, the information could include at least one of the following.

The 7-bit quantized value of the largest measured SS-RSRP value among all the measured SS-RSRP values in the given reporting instance/CSI-Report, which could be indicated/included in part 1 or part 2 of the beam report/UCI, and the 7-bit quantized value of the largest measured CSI-RSRP value among all the measured CRI-RSRP values in the given reporting instance/CSI-Report, which could be indicated/included in part 1 or part 2 of the beam report/UCI.

The position/ordering of the largest measured SS-RSRP value among all the measured SS-RSRP values in the given reporting instance/CSI-Report (or equivalently, the position/ordering of the SSBRI associated with the largest measured SS-RSRP value among all the measured SS-RSRP values in the given reporting instance/CSI-Report), and the position/ordering of the largest measured CSI-RSRP value among all the measured CSI-RSRP values in the given reporting instance/CSI-Report (or equivalently, the position/ordering of the CRI associated with the largest measured CSI-RSRP value among all the measured CSI-RSRP values in the given reporting instance/CSI-Report).

For Scheme-A, a bitmap of length N_ssbri with the bit position '1' indicating the position of the largest measured SS-RSRP among the N_ssbri beam metrics reported in part 1 could be indicated/included in part 1 or part 2 of the beam report/UCI, and a bitmap of length N_cri with the bit position '1' indicating the position of the largest measured CSI-RSRP among the N_cri beam metrics reported in part 2 could be indicated/included in part 1 or part 2 of the beam report/UCI. Alternatively, a bitmap of length N_tot with the bit positions '1's indicating the positions of the largest measured SS-RSRP and the largest measured CSI-RSRP among all the N_tot beam metrics could be indicated/included in either part 1 or part 2 of the beam report/UCI.

For Scheme-B, a bitmap of length N_cri with the bit position '1' indicating the position of the largest measured CSI-RSRP among the N_cri beam metrics reported in part 1 could be indicated/included in part 1 or part 2 of the beam report/UCI, and a bitmap of length N_ssbri with the bit position '1' indicating the position of the largest measured SS-RSRP among the N_ssbri beam metrics reported in part 2 could be indicated/included in part 1 or part 2 of the beam report/UCI. Alternatively, a bitmap of length N_tot with the bit positions '1's indicating the positions of the largest measured SS-RSRP and the largest measured CSI-RSRP among all the N_tot beam metrics could be indicated/included in either part 1 or part 2 of the beam report/UCI.

For Scheme-C, if the largest measured SS-RSRP value corresponds to a beam metric associated with a SSBRI in part 1 of the beam report/UCI, a bitmap of length M_ssbri with the bit position '1' indicating the position of the largest measured SS-RSRP among the M_ssbri beam metrics reported in part 1 could be indicated/included in part 1 of the beam report/UCI.

If the largest measured SS-RSRP value corresponds to a beam metric associated with a SSBRI in part 2 of the beam report/UCI, a bitmap of length (K_ssbri+N_cri) with the bit position '1' indicating the position of the largest measured SS-RSRP among the (K_ssbri+N_cri) beam metrics reported in part 2 could be indicated/included in part 2 of the beam report/UCI.

Furthermore, a bitmap of length (K_ssbri+N_cri) with the bit position '1' indicating the position of the largest measured CSI-RSRP among the (K_ssbri+N_cri) beam metrics reported in part 2 could be indicated/included in part 2 or part 1 of the beam report/UCI. Alternatively, a bitmap of length N_tot with the bit positions '1' s indicating the positions of the largest measured SS-RSRP and the largest measured CSI-RSRP among all the N_tot beam metrics could be indicated/included in either part 1 or part 2 of the beam report/UCI.

For Scheme-D, if the largest measured CSI-RSRP value corresponds to a beam metric associated with a CRI in part 1 of the beam report/UCI, a bitmap of length M_cri with the bit position '1' indicating the position of the largest measured CSI-RSRP among the M_cri beam metrics reported in part 1 could be indicated/included in part 1 of the beam report/UCI.

If the largest measured CSI-RSRP value corresponds to a beam metric associated with a CRI in part 2 of the beam report/UCI, a bitmap of length (K_cri+N_ssbri) with the bit position '1' indicating the position of the largest measured CSI-RSRP among the (K_cri+N_ssbri) beam metrics reported in part 2 could be indicated/included in part 2 of the beam report/UCI.

Furthermore, a bitmap of length (K_cri+N_ssbri) with the bit position '1' indicating the position of the largest measured SS-RSRP among the (K_cri+N_ssbri) beam metrics reported in part 2 could be indicated/included in part 2 or part 1 of the beam report/UCI. Alternatively, a bitmap of length N_tot with the bit positions '1's indicating the positions of the largest measured SS-RSRP and the largest measured CSI-RSRP among all the N_tot beam metrics could be indicated/included in either part 1 or part 2 of the beam report/UCI.

For Scheme-E, if the largest measured SS-RSRP value corresponds to a beam metric associated with a SSBRI in part 1 of the beam report/UCI, a bitmap of length (M_ssbri+M_cri) with the bit position '1' indicating the position of the largest measured SS-RSRP among the (M_ssbri+M_cri) beam metrics reported in part 1 could be indicated/included in part 1 of the beam report/UCI.

If the largest measured SS-RSRP value corresponds to a beam metric associated with a SSBRI in part 2 of the beam report/UCI, a bitmap of length (K_ssbri+K_cri) with the bit position '1' indicating the position of the largest measured SS-RSRP among the (K_ssbri+K_cri) beam metrics reported in part 2 could be indicated/included in part 2 of the beam report/UCI.

Furthermore, if the largest measured CSI-RSRP value corresponds to a beam metric associated with a CRI in part 1 of the beam report/UCI, a bitmap of length (M_ssbri+M_cri) with the bit position '1' indicating the position of the largest measured CSI-RSRP among the (M_ssbri+M_cri) beam metrics reported in part 1 could be indicated/included in part 1 of the beam report/UCI.

If the largest measured CSI-RSRP value corresponds to a beam metric associated with a CRI in part 2 of the beam report/UCI, a bitmap of length (K_ssbri+K_cri) with the bit position '1' indicating the position of the largest measured CSI-RSRP among the (K_ssbri+K_cri) beam metrics reported in part 2 could be indicated/included in part 2 of the beam report/UCI. Alternatively, a bitmap of length N_tot with the bit positions '1's indicating the positions of the largest measured SS-RSRP and the largest measured CSI-RSRP among all the N_tot beam metrics could be indicated/included in either part 1 or part 2 of the beam report/UCI.

In yet another scheme (Scheme-F), if the differential RSRP reporting is enabled, the network or the UE could first determine the position(s)/ordering (or the reference position(s)/ordering) in the two-part CSI reporting instance/CSI-Report for sending one or more reference RSRP values (e.g., the largest measured L1-RSRP values). Alternatively, if differential RSRP reporting is enabled, the (reference) position in the reporting instance/CSI-Report can be fixed, e.g. to the $1^{st}$ beam report or $1^{st}$ position in the reporting instance/CSI-Report.

Various methods of configuring/indicating the (reference) position(s)/ordering in the two-part CSI reporting instance/CSI-Report are presented as follows.

In one method (Method-F.1), the UE could be indicated by the network the (reference) position(s)/ordering in the given two-part CSI reporting instance/CSI-Report for sending one or more reference RSRP values; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For Case 1, in one example, the UE could receive from the network a bitmap of length N0 with the bit position '1' indicating the (reference) position/ordering in part 1 of the beam report/UCI; in another example, the UE could receive from the network a bitmap of length N1 with the bit position '1' indicating the (reference) position/ordering in part 2 of the beam report/UCI; in yet another example, the UE could receive from the network a bitmap of length N_tot with the bit position '1' indicating the (reference) position/ordering in either part 1 or part 2 of the beam report/UCI. For Scheme-A, N0=N_ssbri and N1=N_cri; for Scheme-B, N0=N_cri and N1=N_ssbri; for Scheme-C, N0=M_ssbri and N1=K_ssbri+N_cri; for Scheme-D, N0=M_cri and N1=K_cri+N_ssbri; and for Scheme-E, N0=M_ssbri+M_cri and N1=K_ssbri+K_cri.

For Case 2, in one example, the UE could receive from the network a bitmap of length N0 with the bit position '1' indicating the (reference) position/ordering in part 1 of the beam report/UCI; in another example, the UE could receive from the network a bitmap of length N1 with the bit position '1' indicating the (reference) position/ordering in part 2 of the beam report/UCI; in yet another example, the UE could receive from the network a bitmap of length N_tot with the bit position '1' indicating the (reference) position/ordering in either part 1 or part 2 of the beam report/UCI. For Scheme-A, N0=N_ssbri and N1=0; for Scheme-B, N0=0 and N1=N_ssbri; for Scheme-C, N0=M_ssbri and N1=K_ssbri+N_cri; for Scheme-D, N0=0 and N1=K_cri+N_ssbri; and for Scheme-E, N0=M_ssbri+M_cri and N1=K_ssbri+K_cri.

For Case 3, in one example, the UE could receive from the network a bitmap of length N0 with the bit position '1' indicating the (reference) position/ordering in part 1 of the beam report/UCI; in another example, the UE could receive from the network a bitmap of length N1 with the bit position '1' indicating the (reference) position/ordering in part 2 of the beam report/UCI; in yet another example, the UE could receive from the network a bitmap of length N_tot with the bit position '1' indicating the (reference) position/ordering in either part 1 or part 2 of the beam report/UCI. For Scheme-A, N0=0 and N1=N_cri; for Scheme-B, N0=N_cri and N1=0; for Scheme-C, N0=0 and N1=K_ssbri+N_cri; for Scheme-D, N0=M_cri and N1=K_cri+N_ssbri; and for Scheme-E, N0=M_ssbri+M_cri and N1=K_ssbri+K_cri.

For Case 4, in one example, the UE could receive from the network first bitmap of length N0 with bit position '1' indicating the (reference) position/ordering in part 1 of the beam report/UCI and second bitmap of length N1 with bit position '1' indicating the (reference) position/ordering in part 2 of the beam report/UCI.

In another example, the UE could receive from the network first bitmap of length N0 with bit position '1' indicating the (reference) position/ordering in part 1 of the beam report/UCI to send the reference SS-RSRP value (e.g., the largest measured SS-RSRP value among all the measured SS-RSRP values) and second bitmap of length N0 with bit position '1' indicating the (reference) position/ordering in part 1 of the beam report/UCI to send the reference CSI-RSRP value (e.g., the largest measured CSI-RSRP value among all the measured CSI-RSRP values).

In yet another example, the UE could receive from the network first bitmap of length N1 with bit position '1' indicating the (reference) position/ordering in part 2 of the beam report/UCI to send the reference SS-RSRP value (e.g., the largest measured SS-RSRP value among all the measured SS-RSRP values) and second bitmap of length N1 with bit position '1' indicating the (reference) position/ ordering in part 2 of the beam report/UCI to send the reference CSI-RSRP value (e.g., the largest measured CSI-RSRP value among all the measured CSI-RSRP values).

In yet another example, the UE could receive from the network a bitmap of length N_tot with two bit positions configured as '1's; the first bit position '1' indicating the (reference) position/ordering in the two-part beam report/ UCI to send the reference SS-RSRP value (e.g., the largest measured SS-RSRP value among all the measured SS-RSRP values), and the second bit position '1' indicating the (reference) position/ordering in the two-part beam report/UCI to send the reference CSI-RSRP value (e.g., the largest measured CSI-RSRP value among all the measured CSI-RSRP values).

In yet another example, the UE could receive from the network a bitmap of length N0 with two bit positions configured as '1's; the first bit position '1' indicating the (reference) position/ordering in part 1 of the beam report/ UCI to send the reference SS-RSRP value (e.g., the largest measured SS-RSRP value among all the measured SS-RSRP values), and the second bit position '1' indicating the (reference) position/ordering in part 1 of the beam report/UCI to send the reference CSI-RSRP value (e.g., the largest measured CSI-RSRP value among all the measured CSI-RSRP values).

In yet another example, the UE could receive from the network a bitmap of length N1 with two bit positions configured as '1's; the first bit position '1' indicating the (reference) position/ordering in part 2 of the beam report/ UCI to send the reference SS-RSRP value (e.g., the largest measured SS-RSRP value among all the measured SS-RSRP values), and the second bit position '1' indicating the (reference) position/ordering in part 2 of the beam report/UCI to send the reference CSI-RSRP value (e.g., the largest measured CSI-RSRP value among all the measured CSI-RSRP values). Whether a bit position configured as '1' is the first bit position or the second bit position could be: (1) configured/indicated by the network or (2) determined by the UE and indicated to the network.

In another method (Method-F.2), the UE could autonomously determine and indicate the network the (reference) position(s)/ordering in the given two-part CSI reporting instance/CSI-Report for sending the one or more reference RSRP values; the UE could send to the network the indication in part of the beam/CSI report or multiplexed with HARQ-ACK or multiplexed with scheduling request (SR) or via higher layer signaling such as MAC CE.

For Case 1, in one example, the UE could send to the network (in part 1 of the beam report/UCI) a bitmap of length N0 with the bit position '1' indicating the (reference) position/ordering in part 1 of the beam report/UCI; in another example, the UE could send to the network (in part 2 of the beam report/UCI) a bitmap of length N1 with the bit position '1' indicating the (reference) position/ordering in part 2 of the beam report/UCI; in yet another example, the UE could send to the network (in part 1 or part 2 of the beam report/UCI) a bitmap of length N_tot with the bit position '1' indicating the (reference) position/ordering in either part 1 or part 2 of the beam report/UCI. For Scheme-A, N0=N_ssbri and N1=N_cri; for Scheme-B, N0=N_cri and N1=N_ssbri; for Scheme-C, N0=M_ssbri and N1=K_ssbri+ N_cri; for Scheme-D, N0=M_cri and N1=K_cri+N_ssbri; and for Scheme-E, N0=M_ssbri+M_cri and N1=K_ssbri+ K_cri.

For Case 2, in one example, the UE could send to the network (in part 1 or part 2 of the beam report/UCI) a bitmap of length N0 with the bit position '1' indicating the (reference) position/ordering in part 1 of the beam report/UCI; in another example, the UE could send to the network (in part 1 or part 2 of the beam report/UCI) a bitmap of length N1 with the bit position '1' indicating the (reference) position/ordering in part 2 of the beam report/UCI; in yet another example, the UE could send to the network (in part 1 or part 2 of the beam report/UCI) a bitmap of length N_tot with the bit position '1' indicating the (reference) position/ordering in either part 1 or part 2 of the beam report/UCI. For Scheme-A, N0=N_ssbri and N1=0; for Scheme-B, N0=0 and N1=N_ssbri; for Scheme-C, N0=M_ssbri and N1=K_ssbri+N_cri; for Scheme-D, N0=0 and N1=K_cri+N_ssbri; and for Scheme-E, N0=M_ssbri+M_cri and N1=K_ssbri+K_cri.

For Case 3, in one example, the UE could send to the network (in part 1 or part 2 of the beam report/UCI) a bitmap of length N0 with the bit position '1' indicating the (reference) position/ordering in part 1 of the beam report/UCI; in another example, the UE could send to the network (in part 1 or part 2 of the beam report/UCI) a bitmap of length N1 with the bit position '1' indicating the (reference) position/ordering in part 2 of the beam report/UCI; in yet another example, the UE could send to the network (in part 1 or part 2 of the beam report/UCI) a bitmap of length N_tot with the bit position '1' indicating the (reference) position/ordering in either part 1 or part 2 of the beam report/UCI. For Scheme-A, N0=0 and N1=N_cri; for Scheme-B, N0=N_cri and N1=0; for Scheme-C, N0=0 and N1=K_ssbri+N_cri; for Scheme-D, N0=M_cri and N1=K_cri+N_ssbri; and for Scheme-E, N0=M_ssbri+M_cri and N1=K_ssbri+K_cri.

For Case 4, in one example, the UE could send to the network (in part 1 or part 2 of the beam report/UCI) first bitmap of length N0 with bit position '1' indicating the (reference) position/ordering in part 1 of the beam report/UCI and second bitmap of length N1 with bit position '1' indicating the (reference) position/ordering in part 2 of the beam report/UCI.

In another example, the UE could send to the network (in part 1 or part 2 of the beam report/UCI) first bitmap of length N0 with bit position '1' indicating the (reference) position/ordering in part 1 of the beam report/UCI to send the reference SS-RSRP value (e.g., the largest measured SS-RSRP value among all the measured SS-RSRP values) and second bitmap of length N0 with bit position '1' indicating the (reference) position/ordering in part 1 of the beam report/UCI to send the reference CSI-RSRP value (e.g., the largest measured CSI-RSRP value among all the measured CSI-RSRP values).

In yet another example, the UE could send to the network (in part 1 or part 2 of the beam report/UCI) first bitmap of length N1 with bit position '1' indicating the (reference) position/ordering in part 2 of the beam report/UCI to send the reference SS-RSRP value (e.g., the largest measured SS-RSRP value among all the measured SS-RSRP values) and second bitmap of length N1 with bit position '1' indicating the (reference) position/ordering in part 2 of the beam report/UCI to send the reference CSI-RSRP value (e.g., the largest measured CSI-RSRP value among all the measured CSI-RSRP values).

In yet another example, the UE could send to the network (in part 1 or part 2 of the beam report/UCI) a bitmap of length N_tot with two bit positions configured as '1's; the first bit position '1' indicating the (reference) position/ordering in the two-part beam report/UCI to send the reference SS-RSRP value (e.g., the largest measured SS-RSRP value among all the measured SS-RSRP values), and the second bit position '1' indicating the (reference) position/ordering in the two-part beam report/UCI to send the reference CSI-RSRP value (e.g., the largest measured CSI-RSRP value among all the measured CSI-RSRP values).

In yet another example, the UE could send to the network (in part 1 or part 2 of the beam report/UCI) a bitmap of length N0 with two bit positions configured as '1's; the first bit position '1' indicating the (reference) position/ordering in part 1 of the beam report/UCI to send the reference SS-RSRP value (e.g., the largest measured SS-RSRP value among all the measured SS-RSRP values), and the second bit position '1' indicating the (reference) position/ordering in part 1 of the beam report/UCI to send the reference CSI-RSRP value (e.g., the largest measured CSI-RSRP value among all the measured CSI-RSRP values).

In yet another example, the UE could send to the network (in part 1 or part 2 of the beam report/UCI) a bitmap of length N1 with two bit positions configured as '1's; the first bit position '1' indicating the (reference) position/ordering in part 2 of the beam report/UCI to send the reference SS-RSRP value (e.g., the largest measured SS-RSRP value among all the measured SS-RSRP values), and the second bit position '1' indicating the (reference) position/ordering in part 2 of the beam report/UCI to send the reference CSI-RSRP value (e.g., the largest measured CSI-RSRP value among all the measured CSI-RSRP values). Whether a bit position configured as '1' is the first bit position or the second bit position could be: (1) configured/indicated by the network or (2) determined by the UE and indicated to the network.

Using Scheme-A, Scheme-B, Scheme-C, Scheme-D, Scheme-E and/or Scheme-F could be: (1) configured/indicated by the network and/or (2) determined by the UE and indicated to the network.

As aforementioned, the UE could simultaneously receive from more than one TRPs various RS s/channels using either a single spatial filter or multiple spatial filters. To facilitate the beam measurement and reporting in such a multi-TRP system, the UE could be higher layer configured by the network (e.g., via the higher layer parameter CSI-ResourceConfig) M=1 CSI resource setting; furthermore, in the configured CSI resource setting, the UE could be higher layer configured by the network S>1 (e.g., S=2) SSB/CSI-RS resource sets (denoted by the first SSB/CSI-RS resource set, the second SSB/CSI-RS resource set, . . . , and the S-th SSB/CSI-RS resource set), each corresponding to/associated with a different TRP in the multi-TRP system.

If the beam measurement and reporting for the multi-TRP operation is enabled, the UE could measure from the S>1 SSB/CSI-RS resource sets configured in the same CSI resource setting, and send to network the corresponding beam reports, wherein a beam report could contain/comprise at least one resource indicator such as SSBRI/CRI and at least one beam metric such as L1-RSRP/L1-SINR.

The UE could use a group based beam reporting strategy to send to the network the beam reports for the multi-TRP operation. In the group based beam reporting for the multi-TRP operation, the UE could report to the network in a single CSI reporting instance/CSI-Report N_group≥1 groups of resource indicators (and therefore, N_group≥1 groups of beam metrics). Each group of resource indicators/beam metrics could include/contain/comprise S>1 resource indicators/beam metrics.

The resource indicators in each group of resource indicators could be of the same type, e.g., for S=2, a group of two resource indicators could be {SSBRI, SSBRI} or {CRI, CRI}, or different types, e.g., for S=2, a group of two resource indicators could be {SSBRI, CRI} or {CRI, SSBRI}. The beam metrics in each group of beam metrics could be of the same type, e.g., for S=2, a group of two beam metrics could be {L1-RSRP, L1-RSRP} or {L1-SINR, L1-SINR}, or different types, e.g., for S=2, a group of two beam metrics could be {L1-RSRP, L1-SINR} or {L1-SINR, L1-RSRP}.

In a given group of resource indicators/beam metrics, each of the S resource indicators/beam metrics could indicate a RS resource/beam from a different/distinct SSB/CSI-RS resource set. That is, the S>1 resource indicators in a given group of resource indicators (and therefore, the corresponding S>1 beam metrics in the group of beam metrics) could have one-to-one correspondence to the S>1 SSB/CSI-RS resource sets configured in the same CSI resource setting.

Various means/configurations to order/sort the resource indicators (and therefore, the corresponding beam metrics) in a given group of resource indicators (beam metrics) are presented as follows.

In one example A.1, in a reported group of resource indicators (beam metrics), the first resource indicator (beam metric) could indicate a RS resource/beam from the first SSB/CSI-RS resource set, the second resource indicator (beam metric) could indicate a RS resource/beam from the second SSB/CSI-RS resource set, and so on, and the last (or the S-th) resource indicator (beam metric) could indicate a RS resource/beam from the last (or the S-th) SSB/CSI-RS resource set.

In another example A.2, in a reported group of resource indicators (beam metrics), the first resource indicator (beam metric) could indicate a RS resource/beam from the SSB/CSI-RS resource set with the lowest (or the highest) resource set ID value, the second resource indicator (beam metric) could indicate a RS resource/beam from the SSB/CSI-RS resource set with the second lowest (or the second highest) resource set ID value, and so on, and the last (or the S-th) resource indicator (beam metric) could indicate a RS resource/beam from the SSB/CSI-RS resource set with the highest (or the lowest) resource set ID value.

In yet another example A.3, in a reported group of resource indicators (beam metrics), the UE could be indicated by the network the mapping/association between the S>1 resource indicators (and therefore, the corresponding S>1 beam metrics) and the S>1 SSB/CSI-RS resource sets configured in the same CSI resource setting; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In yet another example A.4, in a reported group of resource indicators (beam metrics), the UE could autonomously determine the mapping/association between the S>1 resource indicators (and therefore, the corresponding S>1 beam metrics) and the S>1 SSB/CSI-RS resource sets configured in the same CSI resource setting; the UE could indicate the network the determined mapping/association relationship in part of the beam/CSI report or multiplexed with HARQ-ACK or multiplexed with scheduling request (SR) or via higher layer signaling such as MAC CE.

The UE could always or be expected to or be configured by the network to report the resource indicator (SSBRI or CRI) with the largest measured beam metric (such as L1-RSRP) in the first reported group of resource indicators. If not, the UE could indicate the network index of the group of resource indicators among all the N_group groups of resource indicators reported in the same reporting instance that contains the resource indicator with the largest measured beam metric (such as L1-RSRP). The UE could indicate the network the position of the resource indicator with the largest measured beam metric among all the measured beam metrics in the first group of resource indicators (or the group of resource indicators that contains the resource indicator with the largest measured beam metric). For instance, the UE could send to the network a bitmap of length S>1 with a bit position configured as '1' indicating the position of the resource indicator with the largest measured beam metric among all the measured beam metrics in the first group of resource indicators (or equivalently, indicating the resource indicator with the largest measured beam metric among all the measured beam metrics).

For instance, for the design example A.1 and S=2, if the beam metric (e.g., L1-RSRP) associated with the resource indicator indicating a RS resource/beam from the second SSB/CSI-RS resource set is the largest among all the measured beam metrics, the UE could send to the network a bitmap [0 1].

The UE could also send to the network an indicator to indicate the SSB/CSI-RS resource set corresponding to the resource indicator with the largest measured beam metric (such as L1-RSRP) in the first reported group of resource indicators. This indicator could be the index of the corresponding SSB/CSI-RS resource set, the position/ordering of the corresponding SSB/CSI-RS resource set in the CSI resource setting or the resource set ID of the corresponding SSB/CSI-RS resource set.

For instance, for the design example A.1 and S=2, the UE could send to the network a one-bit indicator with '0' indicating that the resource indicator with the largest measured beam metric (such as L1-RSRP) in the first reported group of resource indicators indicates a RS resource/beam from the first SSB/CSI-RS resource set, and '1' indicating that the resource indicator with the largest measured beam metric (such as L1-RSRP) in the first reported group of resource indicators indicates a RS resource/beam from the second SSB/CSI-RS resource set.

For differential RSRP reporting for the group based beam reporting for the multi-TRP operation, the largest measured L1-RSRP value among all the measured L1-RSRP values is quantized to a 7-bit value in the range [−140, −44] dBm with 1 dB step size.

The L1-RSRP value(s) corresponding to the resource indicator(s) in the first group of resource indicators other than the resource indicator associated with the largest measured L1-RSRP value is quantized to a 4-bit value with 2 dB step size with a reference to the largest measured L1-RSRP value.

The L1-RSRP values corresponding to the resource indicators in other groups of resource indicators than the first group of resource indicators are quantized to 4-bit values with 2 dB step size with a reference to the largest measured L1-RSRP value.

For differential SINR reporting for the group based beam reporting for the multi-TRP operation, the largest measured L1-SINR value among all the measured L1-SINR values is quantized to a 7-bit value in the range [−23, 40] dB with 0.5 dB step size.

The L1-SINR value(s) corresponding to the resource indicator(s) in the first group of resource indicators other than the resource indicator associated with the largest measured L1-SINR value is quantized to a 4-bit value with 1 dB step size with a reference to the largest measured L1-SINR value.

The L1-SINR values corresponding to the resource indicators in other groups of resource indicators than the first group of resource indicators are quantized to 4-bit values with 1 dB step size with a reference to the largest measured L1-SINR value.

Optionally, the UE could always or be expected to or be configured by the network to report the resource indicator (SSBRI or CRI) with the largest measured beam metric (such as L1-RSRP) as the first resource indicator in the first reported group of resource indicators. In this case, the UE could send to the network an indicator to indicate the SSB/CSI-RS resource set corresponding to the first resource indicator in the first reported group of resource indicators (or equivalently, the resource indicator with the largest measured beam metric among all the measured beam metrics).

This indicator could be the index of the corresponding SSB/CSI-RS resource set, the position/ordering of the corresponding SSB/CSI-RS resource set in the CSI resource setting or the resource set ID of the corresponding SSB/CSI-RS resource set.

For instance, for the design example A.1 and S=2, the UE could send to the network a one-bit indicator with '0' indicating that the first resource indicator in the first reported group of resource indicators (or equivalently, the resource indicator with the largest measured beam metric among all the measured beam metrics) indicates a RS resource/beam from the first SSB/CSI-RS resource set, and '1' indicating that the first resource indicator in the first reported group of resource indicators (or equivalently, the resource indicator with the largest measured beam metric among all the measured beam metrics) indicates a RS resource/beam from the second SSB/CSI-RS resource set.

Other than the first resource indicator, the ordering of the remaining resource indicators in the first group of resource indicators (and therefore, the corresponding beam metrics) could follow those specified in the design examples A.1, A.2, A.3 or A.4. Additionally, the ordering of the resource indicators in other groups of resource indicators than the first group of resource indicators could also follow those specified in the design examples A.1, A.2, A.3 or A.4.

For differential RSRP reporting for the group based beam reporting for the multi-TRP operation, the largest measured L1-RSRP value among all the measured L1-RSRP values is quantized to a 7-bit value in the range [−140, −44] dBm with 1 dB step size.

The L1-RSRP value(s) corresponding to the resource indicator(s) in the first group of resource indicators other than the first resource indicator in the first group of resource indicators (or equivalently, the resource indicator associated with the largest measured L1-RSRP value) is quantized to a 4-bit value with 2 dB step size with a reference to the largest measured L1-RSRP value.

The L1-RSRP values corresponding to the resource indicators in other groups of resource indicators than the first group of resource indicators are quantized to 4-bit values with 2 dB step size with a reference to the largest measured L1-RSRP value.

For differential SINR reporting for the group based beam reporting for the multi-TRP operation, the largest measured L1-SINR value among all the measured L1-SINR values is quantized to a 7-bit value in the range [−23, 40] dB with 0.5 dB step size.

The L1-SINR value(s) corresponding to the resource indicator(s) in the first group of resource indicators other than the first resource indicator in the first group of resource indicators (or equivalently, the resource indicator associated with the largest measured L1-SINR value) is quantized to a 4-bit value with 1 dB step size with a reference to the largest measured L1-SINR value.

The L1-SINR values corresponding to the resource indicators in other groups of resource indicators than the first group of resource indicators are quantized to 4-bit values with 1 dB step size with a reference to the largest measured L1-SINR value.

The UE could be indicated by the network to report the differential RSRP/SINR value(s) for the group based beam reporting for the multi-TRP operation; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE shall use the differential RSRP/SINR reporting if the group based beam reporting for the multi-TRP operation is enabled/configured by the network. For instance, a higher layer parameter groupBasedBeamReportingMtrp could be included/incorporated in CSI reporting setting, e.g., in the higher layer parameter CSI-ReportConfig, to turn on/off the group based beam reporting for the multi-TRP operation. If the UE is configured with the higher layer parameter groupBasedBeamReportingMtrp set to 'enabled', the UE shall use differential RSRP/SINR reporting for the group based beam reporting for the multi-TRP operation. An example of the higher layer parameter CSI-ReportConfig incorporating groupBasedBeamReportingMtrp is presented in TABLE 1.

TABLE 1

| Higher layer parameter CSI-ReportConfig |
|---|
| CSI-ReportConfig ::=    SEQUENCE {<br>   reportConfigId            CSI-ReportConfigId,<br>   carrier            ServCellIndex            OPTIONAL,            -- Need S<br>   resourcesForChannelMeasurement            CSI-ResourceConfigId,<br>   csi-IM-ResourcesForInterference            CSI-ResourceConfigId            OPTIONAL,    -- Need R<br>   nzp-CSI-RS-ResourcesForInterference            CSI-ResourceConfigId            OPTIONAL,    -- Need R<br>   groupBasedBeamReportingMtrp            CHOICE {<br>     enabled                NULL,<br>     disabled                SEQUENCE {<br>       ...<br>     }<br>     ...<br>   }<br>   ...<br>} |

In another example, the UE shall use the differential RSRP/SINR reporting for the group based beam reporting for the multi-TRP operation if the total number (N_group) of network configured groups of resource indicators is greater than or equal to a threshold, denoted by th_Ngroup.

The threshold th_Ngroup could be a fixed value in the specifications, e.g., 1. Alternatively, the UE could be indicated by the network the threshold th_Ngroup; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_Ngroup. For another example, the UE could be first higher layer RRC configured by the network a list of candidate values for the threshold th_Ngroup. The UE could then receive from the network a MAC CE activation command/bitmap to activate one value from the list of candidate values for th_Ngroup as the threshold th_Ngroup.

For instance, a higher layer parameter nrofTotBeamGroup could be included/incorporated in the higher layer parameter groupBasedBeamReportingMtrp (TABLE 1) in CSI-Report-Config. Here, nrofTotBeamGroup indicates the total number (N_group) of beam groups reported in the same reporting instance/CSI-Report, where N_group shall be less than or equal to Nmax_group.

Nmax_group represents the maximum total number of beam groups that can be reported in a single reporting instance/CSI-Report, and is higher layer configured to the UE depending on UE capability. When the field nrofTotBeamGroup is absent, the UE shall apply the value 0. With the higher layer parameter nrofTotBeamGroup, the UE shall use differential RSRP/SINR reporting for the group based beam reporting for the multi-TRP operation if the higher layer parameter nrofTotBeamGroup is configured to be greater than or equal to th_Ngroup.

In yet another example, the UE shall use the differential RSRP/SINR reporting for the group based beam reporting for the multi-TRP operation if the number (S) of network configured resource indicators per group is greater than or equal to a threshold, denoted by th_Ns.

The threshold th_Ns could be a fixed value in the specifications, e.g., 2. Alternatively, the UE could be indicated by the network the threshold th_Ns; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_Ns. For another example, the UE could be first higher layer RRC configured by the network a list of candidate values for the threshold th_Ns. The UE could then receive from the network a MAC CE activation command/bitmap to activate one value from the list of candidate values for th_Ns as the threshold th_Ns.

For instance, a higher layer parameter nrofBeamPerGroup could be included/incorporated in the higher layer parameter groupBasedBeamReportingMtrp (TABLE 1) in CSI-Report-Config. Here, nrofBeamPerGroup indicates the total number (S) of resource indicators reported in a group of resource indicators, where S shall be less than or equal to Smax.

Smax represents the maximum total number of resource indicators that can be reported in a group, and is higher layer configured to the UE depending on UE capability. When the field nrofBeamPerGroup is absent, the UE shall apply the value 0. With the higher layer parameter nrofBeamPerGroup, the UE shall use differential RSRP/SINR reporting for the group based beam reporting for the multi-TRP operation if the higher layer parameter nrofBeamPerGroup is configured to be greater than or equal to th_Ns.

In yet another example, the UE shall use the differential RSRP/SINR reporting for the group based beam reporting for the multi-TRP operation if the total number (N_tot_bm=S×N_group) of resource indicators reported in the same reporting instance/CSI-Report is greater than or equal to a threshold, denoted by th_Nbm.

The threshold th_Nbm could be a fixed value in the specifications, e.g., 2. Alternatively, the UE could be indicated by the network the threshold th_Nbm; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be higher layer RRC configured by the network the exact value of the threshold th_Nbm. For another example, the UE could be first higher layer RRC configured by the network a list of candidate values for the threshold th_Nbm. The UE could then receive from the network a MAC CE activation command/bitmap to activate one value from the list of candidate values for th_Nbm as the threshold th_Nbm.

For instance, a higher layer parameter nrofTotBeam could be included/incorporated in the higher layer parameter groupBasedBeamReportingMtrp (TABLE 1) in CSI-Report-Config. Here, nrofTotBeam indicates the total number (N_tot_bm) of resource indicators reported in all N_group groups of resource indicators, where N_tot_bm shall be less than or equal to Nmax_tot_bm.

Nmax_tot_bm represents the maximum total number of resource indicators that can be reported in N_group groups of resource indicators, and is higher layer configured to the UE depending on UE capability. When the field nrofTotBeam is absent, the UE shall apply the value 0. With the higher layer parameter nrofTotBeam, the UE shall use differential RSRP/SINR reporting for the group based beam reporting for the multi-TRP operation if the higher layer parameter nrofTotBeam is configured to be greater than or equal to th_Nbm.

For illustrative purposes the steps of flowcharts herein are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive:
first configuration information for group based beam reporting for a first resource group, wherein the first configuration information includes a parameter indicating whether the group based beam reporting is enabled, and
second configuration information for first and second resource sets in a channel state information (CSI) resource setting for the group based beam reporting; and
a processor operably coupled to the transceiver, the processor configured to:
determine a resource set, from among the first and second resource sets, with a largest measured reference signal received power (RSRP) value,
identify, based on the first and second configuration information, a synchronization signal block (SSB) resource indicator (SSBRI) or CSI reference signal (CSI-RS) resource indicator (CRI) of the determined resource set, and
determine, based on the first configuration, that the group based beam reporting is enabled,
wherein the transceiver is further configured to transmit, based on the determination that the group based beam reporting is enabled, a report including (i) a one-bit indicator to indicate the determined resource set from which the identified SSBRI or CRI of the first resource group is present first in the report before a SSBRI or CRI of the other of the first and second resource sets, (ii) the identified SSBRI or CRI, and (iii) a differential RSRP value of the SSBRI or CRI of the other resource set.

2. The UE of claim 1, wherein:
the first resource set corresponds to a SSB resource set and the second resource set corresponds to a CSI-RS resource set,
a SSB resource corresponding to the SSBRI and a CSI-RS resource corresponding to the CRI are for simultaneous reception,
the first configuration information indicates a number of groups of SSBRIs and CRIs for simultaneous reception, and
the second configuration information includes at least a number of SSB resources in the SSB resource set and a number of CSI-RS resources in the CSI-RS resource set.

3. The UE of claim 1, wherein:
the first configuration information includes a configuration configuring a two-part uplink control information (UCI),
the configuration configuring the two-part UCI includes information indicating whether to use a part 1 only or both the part 1 and a part 2 of the two-part UCI for the group based beam reporting,
the part 1 in the two-part UCI comprises the first resource group of the SSBRI and the CRI, and indicates a payload size of the part 2 in the two-part UCI,
the part 2 in the two-part UCI comprises one or more second resource groups of SSBRIs and CRIs, and
ordering of the SSBRIs and CRIs in each of the second resource groups follow that in the first resource group.

4. The UE of claim 1, wherein:
when the one-bit indicator is set to '0', the identified SSBRI or CRI of the first resource group that is present first in the report corresponds to the first resource set, and
when the one-bit indicator is set to '1', the identified SSBRI or CRI of the first resource group that is present first in the report corresponds to the second resource set.

5. The UE of claim 1, wherein:
resource indicators of the first resource group included in the report include the identified SSBRI or CRI and the SSBRI or CRI of the other resource set,
the report includes resource indicator and RSRP value reporting for a second resource group, and
ordering of resource indicators of the second resource group in the report follows ordering of the resource indicators of the first resource group.

6. A base station (BS), comprising:
a transceiver configured to:
transmit, to a user equipment (UE):
first configuration information for group based beam reporting for a first resource group, wherein the first configuration information includes a parameter indicating whether the group based beam reporting is enabled, and
second configuration information for first and second resource sets in a channel state information (CSI) resource setting for the group based beam reporting, and
receive, from the UE, based on the group based beam reporting being enabled, a report including (i) a one-bit indicator to indicate a resource set, from among the first or second resource set, from which a synchronization signal block (SSB) resource indicator (SSBRI) or a channel state information reference signal (CSI-RS) resource indicator (CRI) of the first resource group is present first in the report before a SSBRI or CRI of the other of the first and second resource sets, (ii) the identified SSBRI or CRI, and (iii) a differential RSRP value of the SSBRI or CRI of the other resource set,
wherein the indicated resource set has a largest measured reference signal received power (RSRP) value.

7. The BS of claim 6, wherein:
the first resource set corresponds to a SSB resource set and the second resource set corresponds to a CSI-RS resource set,
a SSB resource corresponding to the SSBRI and a CSI-RS resource corresponding to the CRI are for simultaneous reception,
the first configuration information indicates a number of groups of SSBRIs and CRIs for simultaneous reception, and
the second configuration information includes at least a number of SSB resources in the SSB resource set and a number of CSI-RS resources in the CSI-RS resource set.

8. The BS of claim 6, wherein:
the first configuration information includes a configuration configuring a two-part uplink control information (UCI),
the configuration configuring the two-part UCI includes information indicating whether to use a part 1 only or both the part 1 and a part 2 of the two-part UCI for the group based beam reporting, the part 1 in the two-part UCI comprises the first resource group of the SSBRI and the CRI, and indicates a payload size of the part 2 in the two-part UCI, the part 2 in the two-part UCI comprises one or more second resource groups of SSBRIs and CRIs, and ordering of the SSBRIs and CRIs in each of the second resource groups follow that in the first resource group.

9. The BS of claim 6, wherein:

when the one-bit indicator is set to '0', the identified SSBRI or CRI of the first resource group that is present first in the report corresponds to the first resource set, and when the one-bit indicator is set to '1', the identified SSBRI or CRI of the first resource group that is present first in the report corresponds to the second resource set.

10. The BS of claim 6, wherein:

resource indicators of the first resource group included in the report include the identified SSBRI or CRI and the SSBRI or CRI of the other resource set, the report includes resource indicator and RSRP value reporting for a second resource group, and ordering of resource indicators of the second resource group in the report follows ordering of the resource indicators of the first resource group.

11. A method for operating a user equipment (UE), the method comprising:

receiving first configuration information for group based beam reporting for a first resource group, wherein the first configuration information includes a parameter indicating whether the group based beam reporting is enabled;

receiving second configuration information for first and second resource sets in a channel state information (CSI) resource setting for the group based beam reporting;

determine a resource set, from among the first and second resource sets, with a largest measured reference signal received power (RSRP) value, identifying, based on the first and second configuration information, a synchronization signal block (SSB) resource indicator (SSBRI) or CSI reference signal (CSI-RS) resource indicator (CRI) of the determined resource set;

determining, based on the first configuration, that the group based beam reporting is enabled, transmitting, based on the determination that the group based beam reporting is enabled, a report including (i) a one-bit indicator to indicate the determined resource set from which the identified SSBRI or CRI of the first resource group is present first in the report before a SSBRI or CRI of the other of the first and second resource sets, (ii) the identified SSBRI or CRI, and (iii) a differential RSRP value of the SSBRI or CRI of the other resource set.

12. The method of claim 11, wherein:

the first resource set corresponds to a SSB resource set and the second resource set corresponds to a CSI-RS resource set, a SSB resource corresponding to the SSBRI and a CSI-RS resource corresponding to the CRI are for simultaneous reception, the first configuration information indicates a number of groups of SSBRIs and CRIs for simultaneous reception, and the second configuration information includes at least a number of SSB resources in the SSB resource set and a number of CSI-RS resources in the CSI-RS resource set.

13. The method of claim 11, wherein:

the first configuration information includes a configuration configuring a two-part uplink control information (UCI), the configuration configuring the two-part UCI includes information indicating whether to use a part 1 only or both the part 1 and a part 2 of the two-part UCI for the group based beam reporting, the part 1 in the two-part UCI comprises the first resource group of the SSBRI and the CRI, and indicates a payload size of the part 2 in the two-part UCI, the part 2 in the two-part UCI comprises one or more second resource groups of SSBRIs and CRIs, and ordering of the SSBRIs and CRIs in each of the second resource groups follow that in the first resource group.

14. The method of claim 11, wherein:

when the one-bit indicator is set to '0', the identified SSBRI or CRI of the first resource group that is present first in the report corresponds to the first resource set, and when the one-bit indicator is set to '1', the identified SSBRI or CRI of the first resource group that is present first in the report corresponds to the second resource set.

15. The method of claim 11, wherein:

resource indicators of the first resource group included in the report include the identified SSBRI or CRI and the SSBRI or CRI of the other resource set, the report includes resource indicator and RSRP value reporting for a second resource group, and ordering of resource indicators of the second resource group in the report follows ordering of the resource indicators of the first resource group.

* * * * *